US012739684B2

(12) United States Patent
Nagano et al.

(10) Patent No.: US 12,739,684 B2
(45) Date of Patent: Sep. 15, 2026

(54) USER EQUIPMENT, BASE STATION, AND COMMUNICATION CONTROL METHOD

(71) Applicants: DENSO CORPORATION, Kariya-city (JP); TOYOTA JIDOSHA KABUSHIKI KAISHA, Toyota (JP)

(72) Inventors: Tatsuki Nagano, Kariya-city (JP); Tomoyuki Yamamoto, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 322 days.

(21) Appl. No.: 18/466,681

(22) Filed: Sep. 13, 2023

(65) Prior Publication Data

US 2023/0422074 A1 Dec. 28, 2023

Related U.S. Application Data

(63) Continuation of application No. PCT/JP2022/011965, filed on Mar. 16, 2022.

(30) Foreign Application Priority Data

Mar. 24, 2021 (JP) ................................ 2021-050271

(51) Int. Cl.
*H04W 24/10* (2009.01)

(52) U.S. Cl.
CPC .................................. *H04W 24/10* (2013.01)

(58) Field of Classification Search
CPC .................................................... H04W 24/10
See application file for complete search history.

(56) References Cited

U.S. PATENT DOCUMENTS

2015/0327103 A1* 11/2015 Tang ................. H04W 72/0453 370/252
2018/0098253 A1* 4/2018 Huang ............. H04W 36/0088
2021/0120524 A1* 4/2021 Palle ................... H04W 68/005
2022/0322121 A1* 10/2022 Cui ....................... H04W 24/10
2023/0254918 A1* 8/2023 Gurumoorthy ....... H04W 76/15 455/435.1
2024/0098538 A1* 3/2024 Koskinen ............. H04W 24/10
(Continued)

FOREIGN PATENT DOCUMENTS

WO WO-2021025491 A1 2/2021
WO WO-2021031060 A1 2/2021

OTHER PUBLICATIONS

"Switching notification procedure for basic switching scenarios for Single RX UE," Nokia, Nokia Shanghai Bell, 3GPP TSG-RAN WG2 Meeting #113 Electronic, R2-2100508, dated Jan. 25, 2021.
(Continued)

*Primary Examiner* — Zhiren Qin
(74) *Attorney, Agent, or Firm* — Harness, Dickey & Pierce, P.L.C.

(57) ABSTRACT

A user equipment for communicating with a plurality of networks using a plurality of subscriber identity modules communicates with a base station of a first network. The user equipment acquires a measurement timing configuration indicating a timing at which the user equipment measures a radio condition in a second network. The user equipment transmits a radio resource control message including an information element based on the measurement timing configuration to the base station.

13 Claims, 13 Drawing Sheets

(56) References Cited

U.S. PATENT DOCUMENTS

2024/0107409 A1* 3/2024 Da Silva ........... H04W 36/0033
2024/0179790 A1* 5/2024 Schliwa-Bertling ......................... H04W 76/15

OTHER PUBLICATIONS

"Discussion of Scheduling gap for Periodic short-time switching," China telecom, 3GPP TSG-RAN WG2 #113-e, R2-2101789, dated Jan. 25, 2021.
TS 38.304 V16.3.0 NR; User Equipment (UE) procedures in idle mode and in RRC Inactive state; Dec. 2020.
TS 38.211 V16.4.0 NR; Physical channels and modulation; 133 pages; Dec. 2020.
TS 38.331 V16.3.1 NR; Radio Resource Control (RRC); Protocol specification; Jan. 2021.
R2-2009265—Scenarios and Impact analysis for Switching Notification Nokia, Nokia Shanghai Bell; Nov. 2-13, 2020.
R2-2009557—Switching between two links for Multi-SIM, Qualcomm Incorporated; Nov. 2- 13, 2020.
R2-2010350—Discussion on switching mechanism for multi-SIM, Samsung Electronics Co., Ltd; Nov. 2-13, 2020.
R2-2100475—Discussion on Switching Notification Procedure, vivo; Jan. 25-Feb. 5, 2021.
R2-2101951 RAN2-113e Chairman's notes; Jan. 25-Feb. 5, 2021.
R2-2102262 [post112-e][256][Multi-SIM] Network switching details (vivo); Jan. 25-Feb. 5, 2021.
R2-1908896—CATT. Considerations on SSB Measurement Configuration; Aug. 26-30, 2019.

* cited by examiner 1
200A
FIRST NETWORK
220A
221A
MOBILITY MANAGEMENT APPARATUS
222A
GATEWAY APPARATUS
210A
BASE STATION
200B
SECOND NETWORK
220B
221B
MOBILITY MANAGEMENT APPARATUS
222B
GATEWAY APPARATUS
210B
BASE STATION
C1
C2
100
UE

FIG. 2

100 UE
NAS
RRC
PDCP
RLC
MAC
PHY

210 BASE STATION
RRC
PDCP
RLC
MAC
PHY

221 MOBILITY MANAGEMENT APPARATUS
NAS

FIG. 5

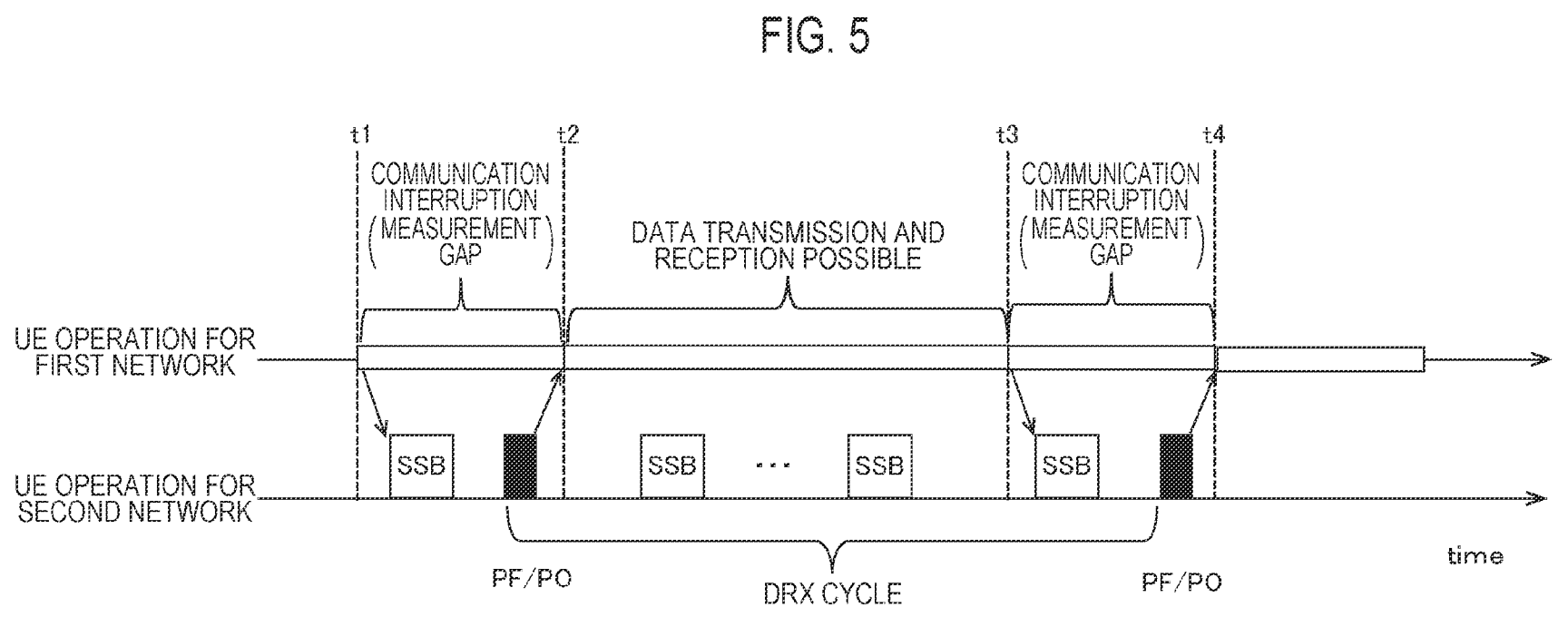

UE OPERATION FOR FIRST NETWORK

UE OPERATION FOR SECOND NETWORK time t1 t2 t3 t4

COMMUNICATION INTERRUPTION (MEASUREMENT GAP)

DATA TRANSMISSION AND RECEPTION POSSIBLE

COMMUNICATION INTERRUPTION (MEASUREMENT GAP)

SSB

SSB

...

SSB

SSB

PF/PO

PF/PO

DRX CYCLE

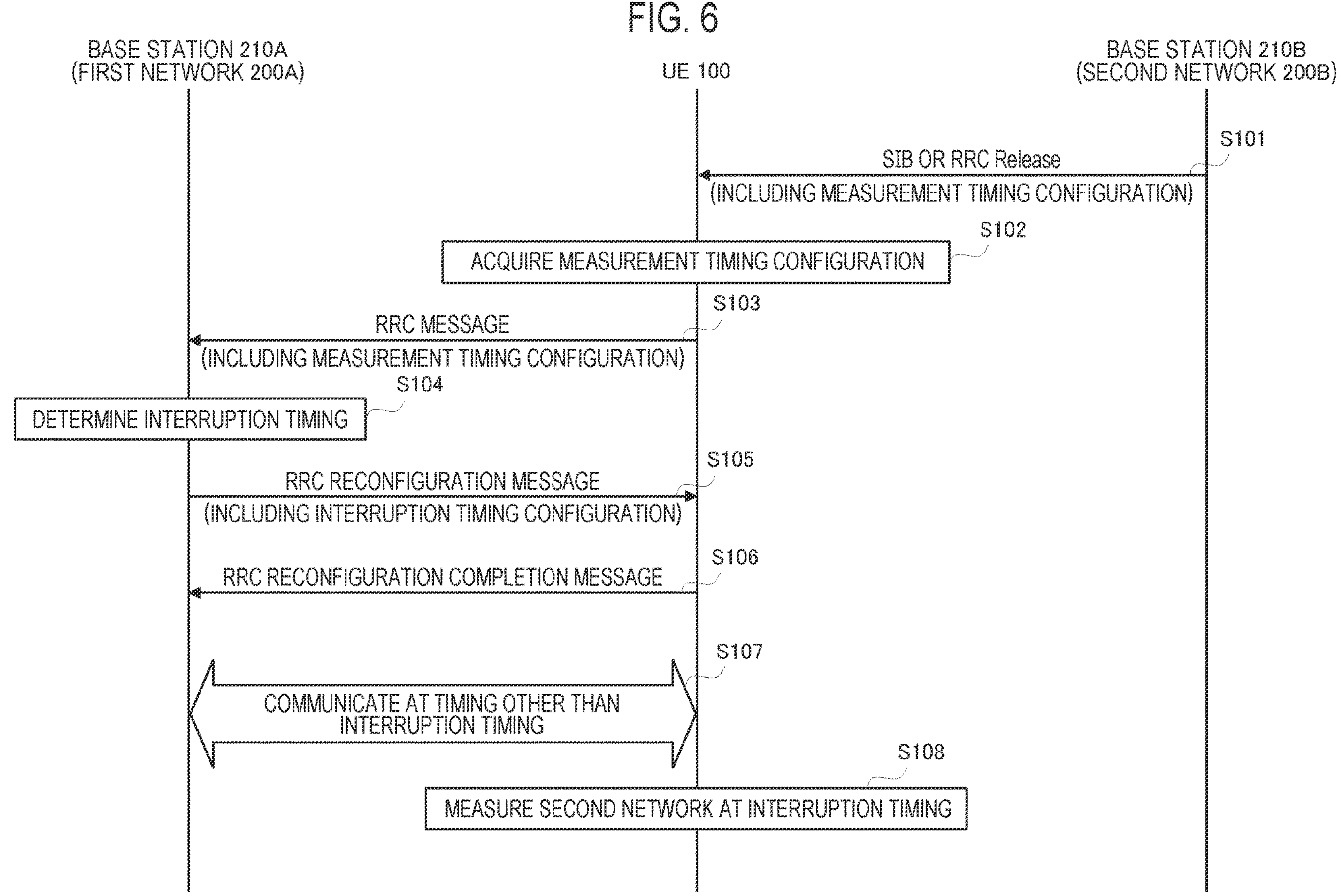
FIG. 6
BASE STATION 210A (FIRST NETWORK 200A)
UE 100
BASE STATION 210B (SECOND NETWORK 200B)
S101
SIB OR RRC Release
(INCLUDING MEASUREMENT TIMING CONFIGURATION)
S102
ACQUIRE MEASUREMENT TIMING CONFIGURATION
S103
RRC MESSAGE
(INCLUDING MEASUREMENT TIMING CONFIGURATION)
S104
DETERMINE INTERRUPTION TIMING
S105
RRC RECONFIGURATION MESSAGE
(INCLUDING INTERRUPTION TIMING CONFIGURATION)
S106
RRC RECONFIGURATION COMPLETION MESSAGE
S107
COMMUNICATE AT TIMING OTHER THAN INTERRUPTION TIMING
S108
MEASURE SECOND NETWORK AT INTERRUPTION TIMING

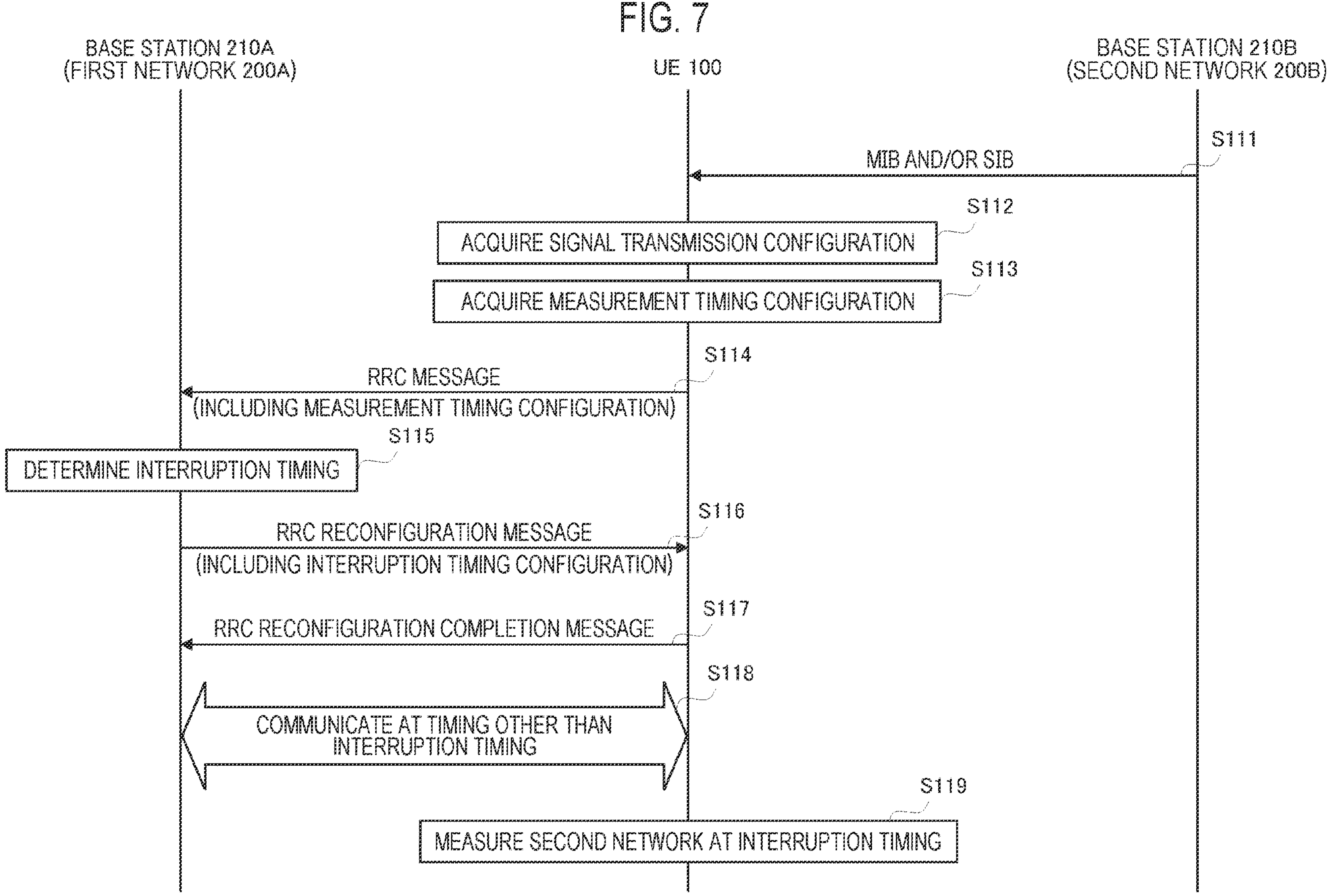
FIG. 7
BASE STATION 210A (FIRST NETWORK 200A)
UE 100
BASE STATION 210B (SECOND NETWORK 200B)
S111
MIB AND/OR SIB
S112
ACQUIRE SIGNAL TRANSMISSION CONFIGURATION
S113
ACQUIRE MEASUREMENT TIMING CONFIGURATION
S114
RRC MESSAGE (INCLUDING MEASUREMENT TIMING CONFIGURATION)
S115
DETERMINE INTERRUPTION TIMING
S116
RRC RECONFIGURATION MESSAGE (INCLUDING INTERRUPTION TIMING CONFIGURATION)
S117
RRC RECONFIGURATION COMPLETION MESSAGE
S118
COMMUNICATE AT TIMING OTHER THAN INTERRUPTION TIMING
S119
MEASURE SECOND NETWORK AT INTERRUPTION TIMING

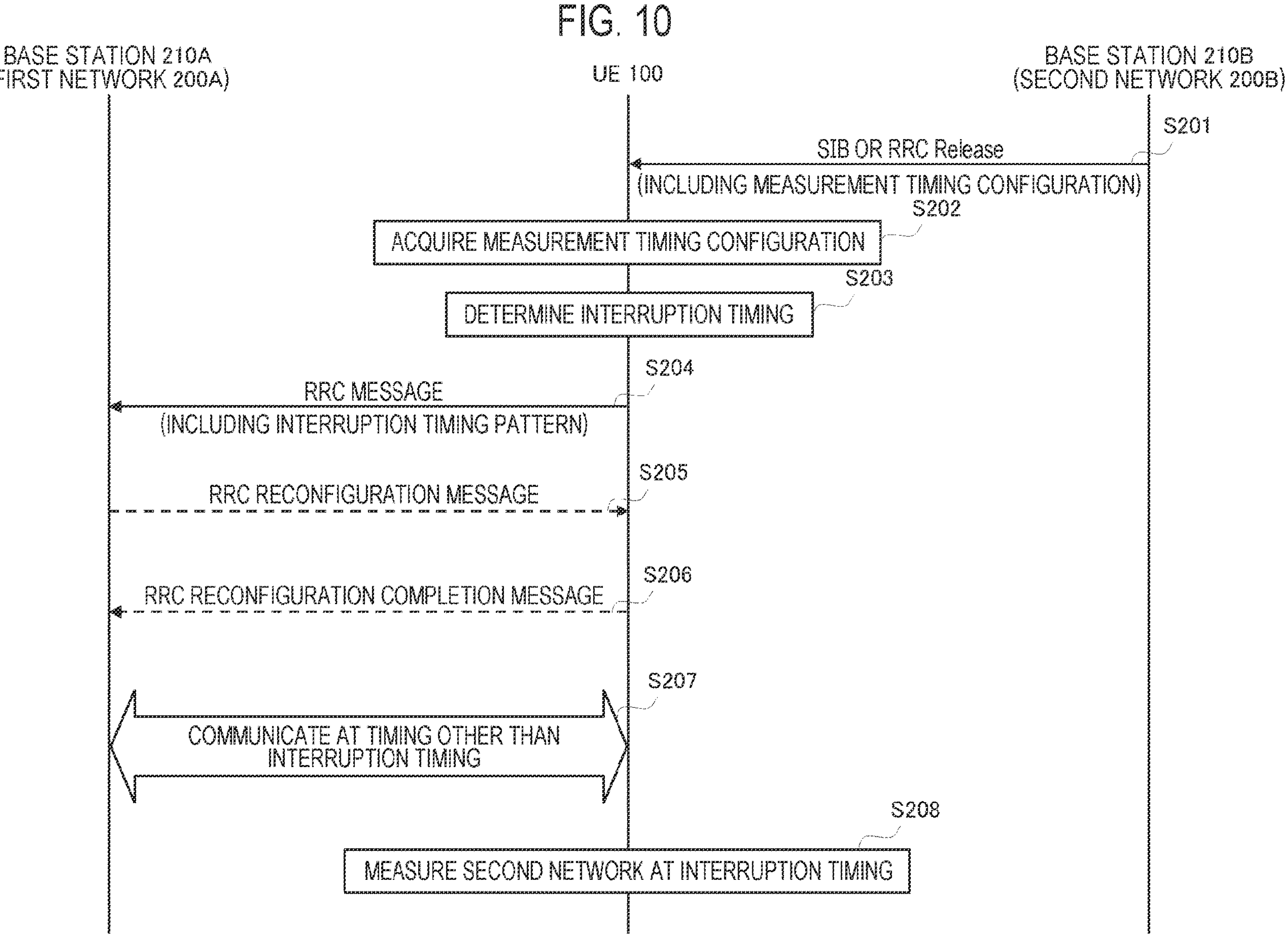
FIG. 10
BASE STATION 210A (FIRST NETWORK 200A)
UE 100
BASE STATION 210B (SECOND NETWORK 200B)
S201
SIB OR RRC Release
(INCLUDING MEASUREMENT TIMING CONFIGURATION)
S202
ACQUIRE MEASUREMENT TIMING CONFIGURATION
S203
DETERMINE INTERRUPTION TIMING
S204
RRC MESSAGE
(INCLUDING INTERRUPTION TIMING PATTERN)
S205
RRC RECONFIGURATION MESSAGE
S206
RRC RECONFIGURATION COMPLETION MESSAGE
S207
COMMUNICATE AT TIMING OTHER THAN INTERRUPTION TIMING
S208
MEASURE SECOND NETWORK AT INTERRUPTION TIMING

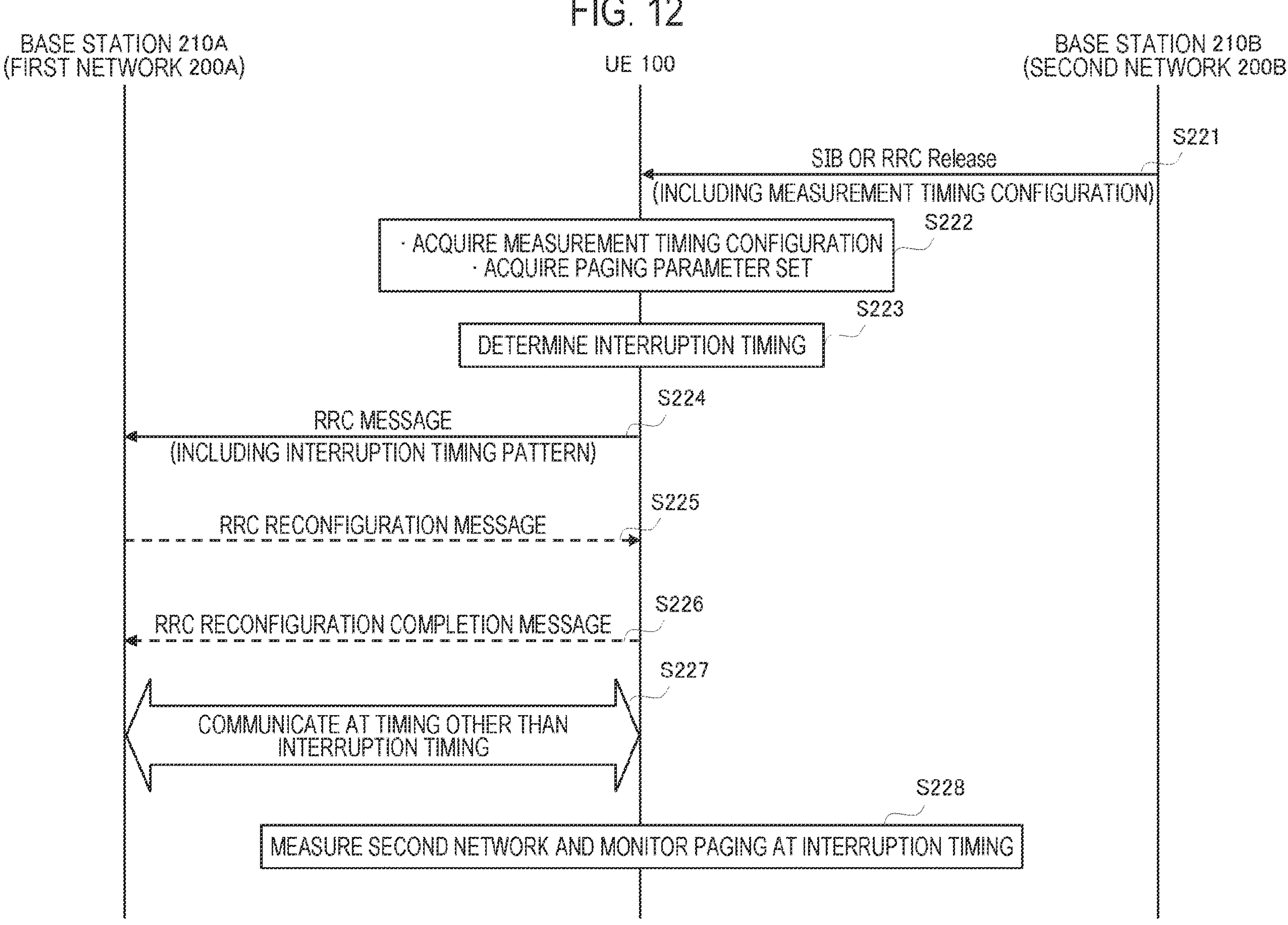
FIG. 12
BASE STATION 210A (FIRST NETWORK 200A)
UE 100
BASE STATION 210B (SECOND NETWORK 200B)
S221
SIB OR RRC Release
(INCLUDING MEASUREMENT TIMING CONFIGURATION)
S222
· ACQUIRE MEASUREMENT TIMING CONFIGURATION
· ACQUIRE PAGING PARAMETER SET
S223
DETERMINE INTERRUPTION TIMING
S224
RRC MESSAGE
(INCLUDING INTERRUPTION TIMING PATTERN)
S225
RRC RECONFIGURATION MESSAGE
S226
RRC RECONFIGURATION COMPLETION MESSAGE
S227
COMMUNICATE AT TIMING OTHER THAN INTERRUPTION TIMING
S228
MEASURE SECOND NETWORK AND MONITOR PAGING AT INTERRUPTION TIMING

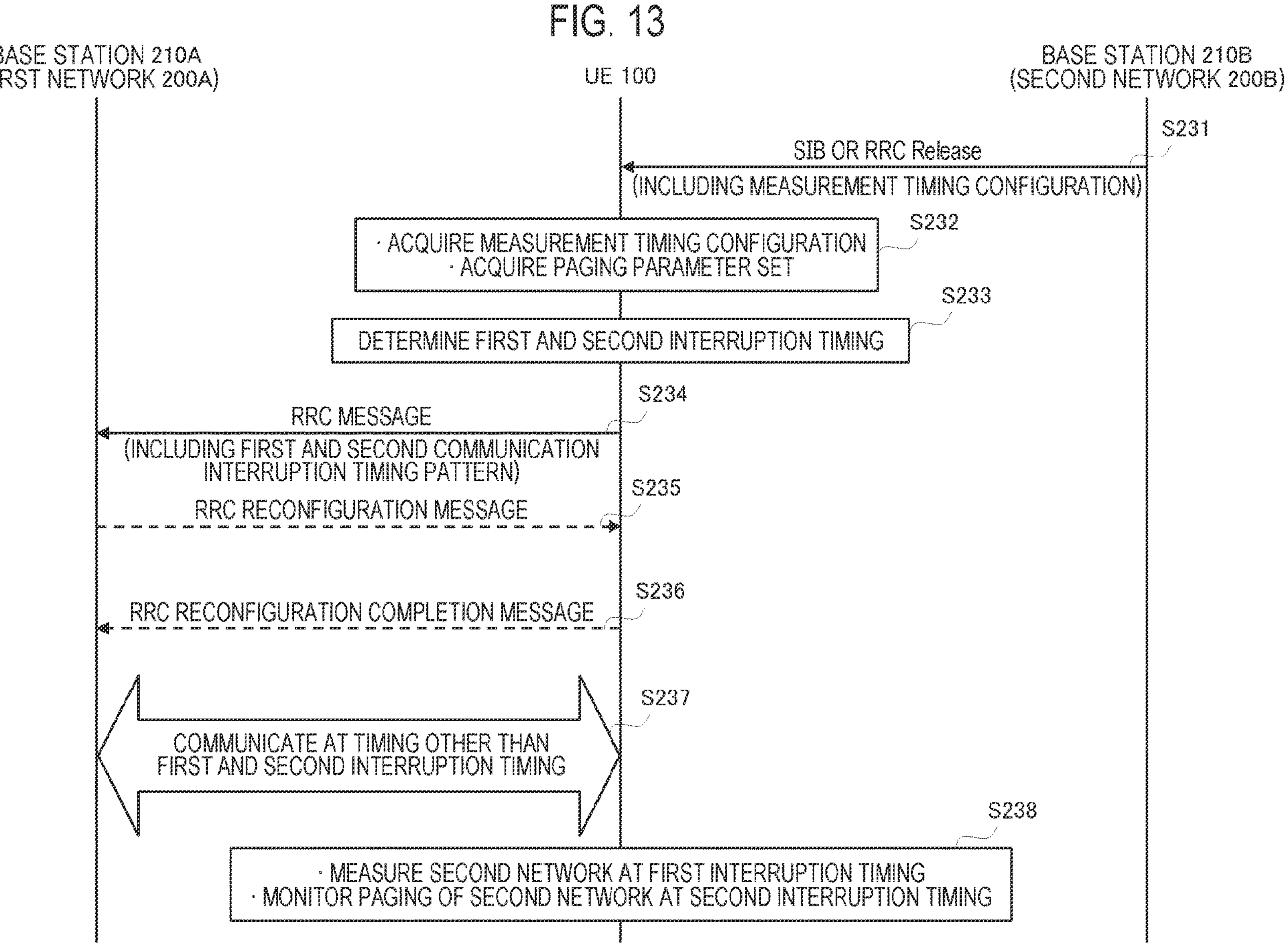
FIG. 13
BASE STATION 210A
(FIRST NETWORK 200A)
UE 100
BASE STATION 210B
(SECOND NETWORK 200B)
S231
SIB OR RRC Release
(INCLUDING MEASUREMENT TIMING CONFIGURATION)
S232
· ACQUIRE MEASUREMENT TIMING CONFIGURATION
· ACQUIRE PAGING PARAMETER SET
S233
DETERMINE FIRST AND SECOND INTERRUPTION TIMING
S234
RRC MESSAGE
(INCLUDING FIRST AND SECOND COMMUNICATION INTERRUPTION TIMING PATTERN)
S235
RRC RECONFIGURATION MESSAGE
S236
RRC RECONFIGURATION COMPLETION MESSAGE
S237
COMMUNICATE AT TIMING OTHER THAN FIRST AND SECOND INTERRUPTION TIMING
S238
· MEASURE SECOND NETWORK AT FIRST INTERRUPTION TIMING
· MONITOR PAGING OF SECOND NETWORK AT SECOND INTERRUPTION TIMING

USER EQUIPMENT, BASE STATION, AND COMMUNICATION CONTROL METHOD

CROSS-REFERENCE TO RELATED APPLICATIONS

The present application is a continuation application of International Patent Application No. PCT/JP2022/011965, filed Mar. 16, 2022, which designated the U.S., and claims the benefit of priority to Japanese Patent Application No. 2021-050271, filed on Mar. 24, 2021. The entire disclosures of the above applications are incorporated herein by reference.

TECHNICAL FIELD

The present disclosure relates to a user equipment used in a mobile communication system, a base station, and a communication control method.

BACKGROUND ART

In Release 17 of the 3rd generation partnership project (3GPP), which is a mobile communication system standardization project, a work item has been launched for a user equipment equipped with a plurality of subscriber identity modules to formulate a function of performing data communication while existing in a plurality of networks of communication carriers.

Currently, a mechanism in which a user equipment existing in a plurality of networks receives a paging (that is, an incoming call) is not specified in standard specifications, and depends on implementation of the user equipment. However, in a case where an incoming call is received from one network (hereinafter, “first network”) during communication with another network (hereinafter, “second network”), the user equipment overlooks the incoming call. Thus, methods of receiving incoming calls from a plurality of networks in cooperation with each network have been studied in the field of 3GPP standardization (see, for example, Non Patent Literatures 1 to 4).

Non Patent Literatures 1 to 4 describe a method in which, in a case where there is only one receiver (RX) included in a user equipment equipped with a plurality of subscriber identity modules, a first network configures an interruption timing at which communication with the first network can be temporarily interrupted to the user equipment in order for the user equipment to monitor paging of a second network while maintaining connection with the first network. Such interruption timing may be referred to as a “gap”.

CITATION LIST

Non Patent Literature

Non Patent Literature 1: 3GPP contributions: R2-2009265, “Scenarios and Impact analysis for Switching Notification”

Non Patent Literature 2: 3GPP contributions: R2-2009557, “Switching between two links for Multi-SIM”

Non Patent Literature 3: 3GPP contributions: R2-2010350, “Discussion on switching mechanism for multi-SIM”

Non Patent Literature 4: 3GPP contributions: R2-2100475, “Discussion on Switching Notification Procedure”

SUMMARY OF INVENTION

In order for the user equipment to receive paging from the second network, the user equipment needs to perform measurement of a radio condition in the second network prior to monitoring the paging from the second network.

However, when the first network does not know the transmission configuration of a synchronization signal and/or a reference signal of the second network, the first network cannot configure an appropriate interruption timing in consideration of the measurement timing of the radio state of the second network by the user equipment. From this, the inventor has found a problem that it is difficult for the user equipment to efficiently monitor paging of the second network while maintaining the connection with the first network.

Accordingly, an object of the present disclosure is to provide a user equipment, a base station, and a communication control method capable of efficiently monitoring paging in a second network while maintaining a connection state (RRC_CONNECTED) in a radio resource control (RRC) layer with a first network.

In a first aspect, a user equipment communicates with a plurality of networks using a plurality of subscriber identity modules. The user equipment comprises: a communicator configured to communicate with a base station of a first network; and a controller configured to acquire a measurement timing configuration indicating a timing at which the user equipment measures a radio condition in a second network. The communicator is configured to transmit a radio resource control (RRC) message including an information element based on the measurement timing configuration to the base station.

In a second aspect, a base station of a first network, comprises: a communicator configured to receive, from a user equipment, a radio resource control (RRC) message including an information element based on a measurement timing configuration indicating a timing at which the user equipment measures a radio condition in a second network; and a controller configured to acquire the information element included in the RRC message.

In a third aspect, a communication control method is performed by a user equipment for communicating with a plurality of networks using a plurality of subscriber identity modules. The method comprises the steps of: communicating with a base station of a first network; acquiring a measurement timing configuration indicating a timing at which the user equipment measures a radio condition in a second network; and transmitting a radio resource control (RRC) message including an information element based on the measurement timing configuration to the base station.

BRIEF DESCRIPTION OF DRAWINGS

The foregoing and other objects, features, and advantages of the present disclosure will become more apparent from the following detailed description with reference to the accompanying drawings. The drawings are as follows.

FIG. 2 is a diagram illustrating a configuration example of a protocol stack of the mobile communication system according to the first and second embodiments.

FIG. 5 is a diagram illustrating an operation example of the UE in which an interruption timing is configured from the base station of the first network according to the first and second embodiments.

FIG. 6 is a diagram illustrating a first operation example of the first embodiment.

FIG. 7 is a diagram illustrating a second operation example of the first embodiment.

FIG. 10 is a diagram illustrating a first operation example of the second embodiment.

FIG. 12 is a diagram illustrating a third operation example of the second embodiment.

FIG. 13 is a diagram illustrating a fourth operation example of the second embodiment.

DESCRIPTION OF EMBODIMENTS

Figure 1:
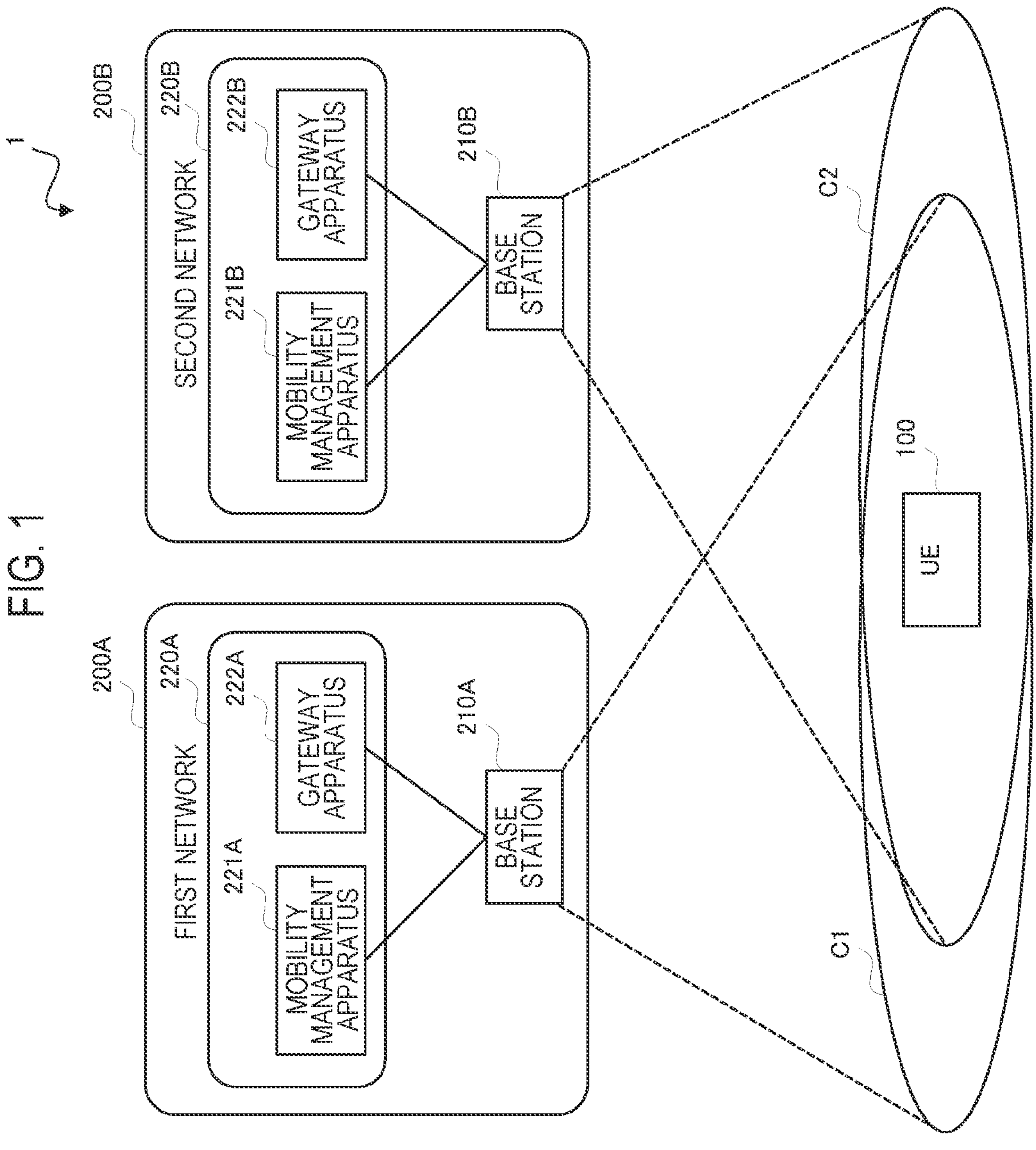
FIG. 1 is a diagram illustrating a configuration example of a mobile communication system according to first and second embodiments.

With reference to the drawings, a mobile communication system according to an embodiment is described. In the description of the drawings, identical or similar parts are marked with identical or similar reference numerals.

First Embodiment

A first embodiment will be described with reference to FIGS. 1 to 9.

(System Configuration)

A configuration of a mobile communication system 1 according to the first embodiment will be described with reference to FIG. 1. Hereinafter, an example in which the mobile communication system 1 is a 5th generation system (5G/NR: New Radio) of the 3GPP standard will be mainly described. However, a fourth generation system (4G/LTE: Long Term Evolution) system and/or a sixth generation system may be at least partially applied to the mobile communication system 1.

As illustrated in FIG. 1, a mobile communication system 1 according to the first embodiment includes a user equipment (UE) 100, a first network 200A, and a second network 200B.

The UE 100 is a mobile radio communication apparatus. The UE 100 is only required to be any apparatus used by the user. For example, the UE 100 is a mobile phone terminal (including a smartphone), a tablet terminal, a laptop PC, a communication module (including a communication card or a chipset), a sensor or an apparatus provided in the sensor, a vehicle or an apparatus provided in the vehicle (Vehicle UE), and/or a flight vehicle or an apparatus provided in the flight vehicle (Aerial UE).

The UE 100 is a multi-SIM device is compatible with a plurality of subscriber identity modules (SIM). In the following, an example in which the UE 100 is compatible with two SIMS will be mainly described, but the UE 100 may be compatible with three or more SIMs. "Compatible with a plurality of SIMS" means that the UE 100 has a capability to handle a plurality of SIMS, and the plurality of SIMS may not necessarily be mounted in the UE 100. Such a UE 100 may be referred to as a "UE supporting a plurality of SIMS". Note that the SIM is not limited to a card type SIM (what is called a SIM card), and may be an embedded SIM (what is called an eSIM) incorporated in the UE 100 in advance. The SIM may be referred to as a universal subscriber identity module (USIM).

The first network 200A is a network associated with one SIM of the UE 100. The second network 200B is a network associated with the other SIM of the UE 100. It is assumed that the UE 100 has performed location registration in the first network 200A using one SIM and has performed location registration in the second network 200B using another SIM. That is, the UE 100 exists in each of the first network 200A and the second network 200B. The first network 200A and the second network 200B may be networks of different communication operators. However, the first network 200A and the second network 200B may be networks of the same communication operator. Different public land mobile network (PLMN) IDs may be allocated to the first network 200A and the second network 200B.

The first network 200A includes a base station 210A constituting a radio access network, and a core network 220A. The core network 220A includes a mobility management apparatus 221A and a gateway apparatus 222A. Similarly, the second network 200B includes a base station 210B constituting a radio access network, and a core network 220B. The core network 220B includes a mobility management apparatus 221B and a gateway apparatus 222B. Hereinafter, the base stations 210A and 200B will be simply referred to as a base station 210 when not distinguished, the mobility management apparatuses 221A and 221B will be simply referred to as a mobility management apparatus 221 when not distinguished, and the gateway apparatuses 222A and 222B will be simply referred to as a gateway apparatus 222 when not distinguished.

The base station 210 is a radio communication apparatus that performs radio communication with the UE 100. The base station 210 manages one or more cells. The base station 210 performs radio communication with the UE 100 that has established a connection in a radio resource control (RRC) layer with its own cell. The base station 210 has a radio resource management (RRM) function, a user data (hereinafter, simply referred to as "data") routing function, a measurement control function for mobility control and scheduling, and/or the like. The "cell" is used as a term indicating a minimum unit of a radio communication area. The "cell" is also used as a term indicating a function or a resource that performs radio communication with the UE 100. One cell belongs to one carrier frequency. FIG. 1 illustrates an example in which the base station 210A manages the cell C1 and the base station 210B manages the cell C2. The UE 100 is located in an overlapping region of the cell C1 and the cell C2.

The base station 210 may be a gNB that is a 5G/NR base station or an eNB that is a 4G/LTE base station. Hereinafter, an example in which the base station 210 is a gNB will be mainly described. The base station 210 may be divided into a central unit (CU) and a distributed unit (DU). The base station 210 may be a relay node such as an integrated access and backhaul (IAB) node.

The mobility management apparatus 221 is an apparatus corresponding to a control plane, and is an apparatus that performs various mobility management for the UE 100. The mobility management apparatus 221 communicates with the UE 100 using non-access stratum (NAS) signaling and manages information of a tracking area in which the UE 100 exists. The mobility management apparatus 221 performs paging through the base station 210 in order to notify an incoming call to the UE 100. The mobility management apparatus 221 may be an access and mobility management function (AMF) of 5G/NR or a mobility management entity (MME) of 4G/LTE.

The gateway apparatus 222 is an apparatus corresponding to the user plane and performs transfer control of data of the UE 100. The gateway apparatus 222 may be a user plane function (UPF) or a 4G/LTE serving gateway (S-GW).

In the mobile communication system 1 configured as described above, a scenario is assumed in which the UE 100 including only one receiver (RX) performs data communication while existing in the first network 200A and the second network 200B. When paging is performed from the second network 200B while communicating with the first network 200A, the UE 100 cannot receive the paging and overlooks the incoming call. In order to monitor paging of the second network 200B while the UE 100 maintains the connection with the first network 200A, the first network 200A configures, to the UE 100, an interruption timing at which communication with the first network 200A can be temporarily interrupted.

In order for the UE 100 to receive paging from the second network 200B, the UE 100 needs to measure a radio condition in the second network 200B before monitoring paging from the second network 200B. The measurement of the radio condition includes at least one of a process of receiving a synchronization signal and establishing synchronization, and a process of executing measurement based on a known signal. That is, in order for the UE 100 to measure the radio condition in the second network 200B, it is necessary to receive the known signal from the base station 210 of the second network 200B.

Here, the known signal may be an SSB (SS/PBCH Block). For example, in a case where the base station 210B is a gNB, the known signal used by the UE 100 to measure the radio condition may be an SSB (SS: Synchronization Signal/PBCH Block). The SSB includes a primary synchronization signal (PSS), a secondary synchronization signal (SSS), a physical broadcast channel (PBCH), and a demodulation reference signal (DMRS). For example, the SSB may be constituted by four consecutive orthogonal frequency division multiplexing (OFDM) symbols in the time domain. In addition, the SSB may include 240 consecutive subcarriers (that is, 20 resource blocks) in the frequency domain. The PBCH is a physical channel that carries a master information block (MIB). In addition, for example, in a case where the base station 210B is an eNB, the known signal used by the UE 100 to measure the radio condition may be the PSS and/or the SSS. Hereinafter, an example in which the base station 210B is a gNB will be mainly described, but the base station 210B may be an eNB.

(Configuration Example of Protocol Stack)

A configuration example of a protocol stack of the mobile communication system 1 will be described with reference to FIG. 2.

Figure 2:
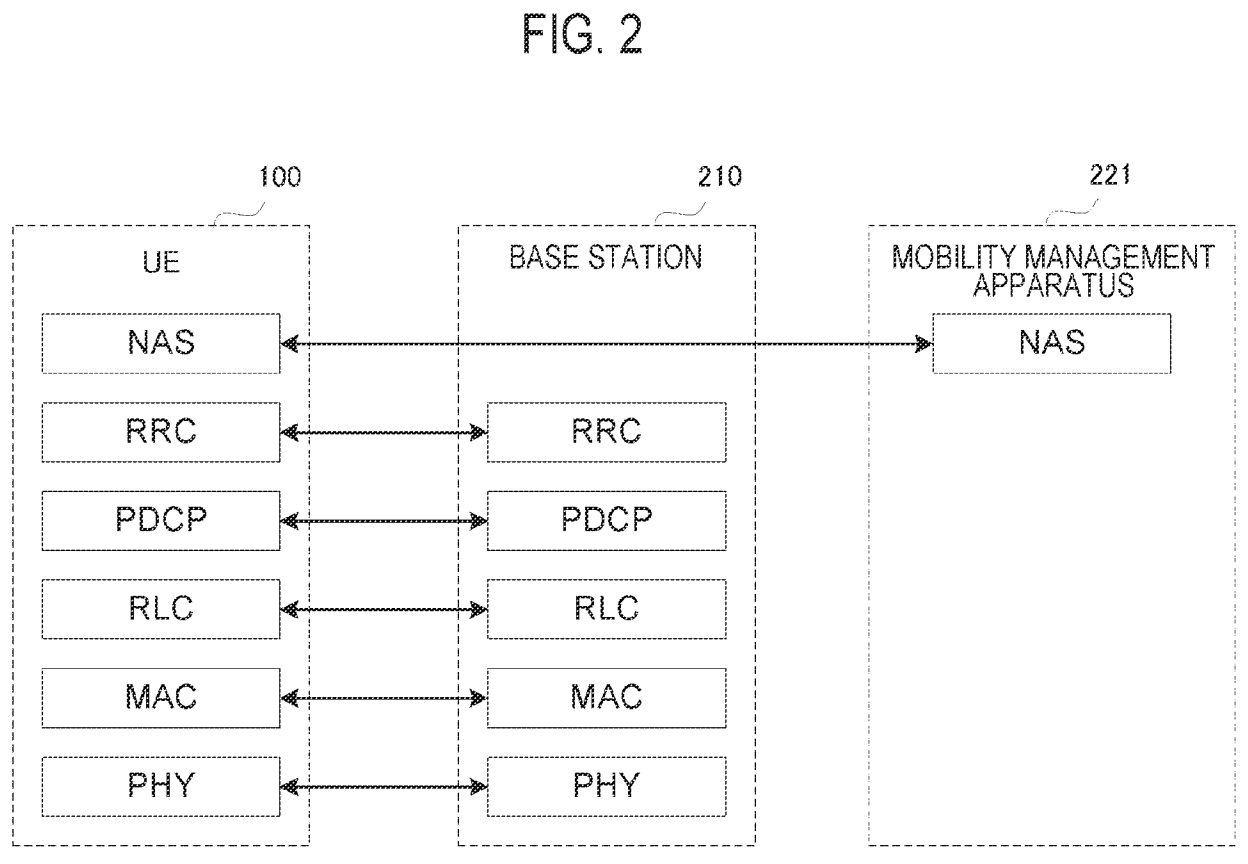

As illustrated in FIG. 2, a protocol of a radio section between the UE 100 and the base station 210 includes a physical (PHY) layer, a medium access control (MAC) layer, a radio link control (RLC) layer, a packet data convergence protocol (PDCP) layer, and a radio resource control (RRC) layer.

The PHY layer performs encoding/decoding, modulation/demodulation, antenna mapping/demapping, and resource mapping/demapping. Data and control information are transmitted between the PHY layer of the UE 100 and the PHY layer of the base station 210 via a physical channel.

The MAC layer performs priority control of data, a retransmission process by hybrid automatic repeat request (HARM), a random access procedure, and the like. Data and control information are transmitted between the MAC layer of the UE 100 and the MAC layer of the base station 210 via a transport channel. The MAC layer of the base station 210 includes a scheduler. The scheduler determines uplink and downlink transport formats (transport block size, modulation and coding scheme (MCS)) and allocated resources to the UE 100.

The RLC layer transmits data to the RLC layer on the reception side using the functions of the MAC layer and the PHY layer. Data and control information are transmitted between the RLC layer of the UE 100 and the RLC layer of the base station 210 via a logical channel.

The PDCP layer performs header compression/decompression and encryption/decryption.

A service data adaptation protocol (SDAP) layer may be provided as an upper layer of the PDCP layer. The service data adaptation protocol (SDAP) layer performs mapping between an IP flow that is a unit in which a core network performs quality of service (QoS) control and a radio bearer that is a unit in which an access stratum (AS) performs QoS control.

The RRC layer controls a logical channel, a transport channel, and a physical channel according to establishment, re-establishment, and release of a radio bearer. RRC signaling for various configurations is transmitted between the RRC layer of the UE 100 and the RRC layer of the base station 210. When there is an RRC connection between the RRC of the UE 100 and the RRC of the base station 210, the UE 100 is in an RRC connected state. When there is no RRC connection between the RRC of the UE 100 and the RRC of the base station 210, the UE 100 is in an RRC idle state. When the RRC connection between the RRC of the UE 100 and the RRC of the base station 210 is suspended, the UE 100 is in an RRC inactive state.

A NAS layer located above the RRC layer performs session management and mobility management of the UE 100. NAS signaling is transmitted between the NAS layer of the UE 100 and the NAS layer of the mobility management apparatus 221.

Note that the UE 100 has an application layer and the like in addition to the protocol of the radio interface.

(Configuration Example of UE)

A configuration example of the UE 100 will be described with reference to FIG. 3.

Figure 3:
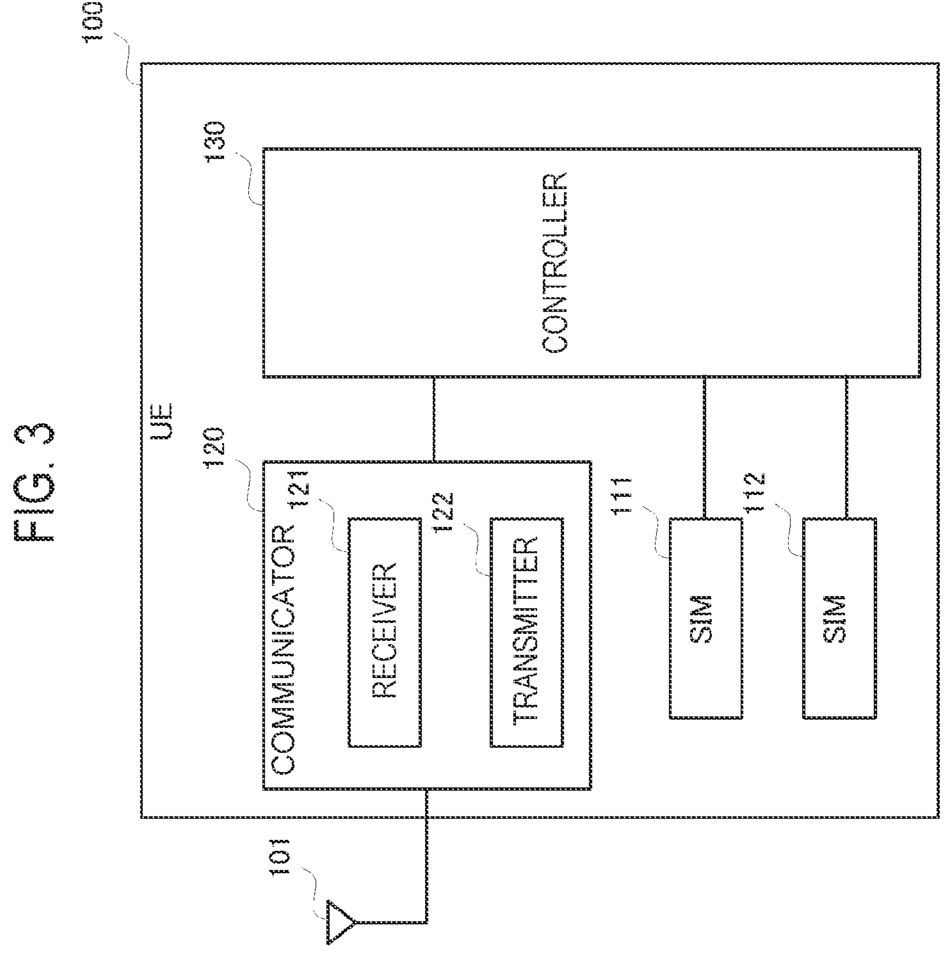
FIG. 3 is a diagram illustrating a configuration example of a user equipment (UE) according to the first and second embodiments.

As illustrated in FIG. 3, the UE 100 includes an antenna 101, a SIM 111, a SIM 112, a communicator 120, and a controller 130. The antenna 101 may be provided outside the UE 100. The SIM 111 and the SIM 112 are SIM cards or eSIM.

The SIM 111 stores subscriber information and configuration information necessary for the UE 100 to communicate with the first network 200A. The SIM 111 stores identification information of the UE 100 in the first network 200A, for example, a telephone number, an international mobile subscriber identity (IMSI), and the like.

The SIM 112 stores subscriber information and configuration information necessary for the UE 100 to communicate with the second network 200B. The SIM 112 stores the identification information of the UE 100 in the second network 200B, for example, a telephone number, IMSI, and the like.

The communicator 120 performs radio communication with the first network 200A and radio communication with the second network 200B via the antenna 101 under the control of the controller 130. The communicator 120 may include only one receiver (RX) 121. In this case, the communicator 120 cannot simultaneously perform reception from the first network 200A and reception from the second network 200B. The communicator 120 may include only one transmitter (TX) 122. However, the communicator 120 may include a plurality of transmitters 122. The receiver 121 converts a radio signal received by the antenna 101 into a received signal that is a baseband signal, performs signal processing on the received signal, and outputs the received signal to the controller 130. The transmitter 122 performs signal processing on a transmission signal that is a baseband signal output from the controller 130, converts the signal into a radio signal, and transmits the radio signal from the antenna 101.

The controller 130 controls the communicator 120 and performs various controls in the UE 100. The controller 130 controls communication with the first network 200A using the SIM 111 and controls communication with the second network 200B using the SIM 112. The controller 130 includes at least one processor and at least one memory. The memory stores a program executed by the processor and information used for processing by the processor. The memory may include at least one of a read only memory (ROM), an erasable programmable read only memory (EPROM), an electrically erasable programmable read only memory (EEPROM), a random access memory (RAM), and a flash memory. The processor may include a digital signal processor (DSP) that performs digital processing of the digital signals and a central processing unit (CPU) that executes programs. Note that a part of the memory may be provided in the communicator 120. In addition, the DSP may be provided in the communicator 120.

In the UE 100 configured as described above, the controller 130 acquires a measurement timing configuration indicating the timing at which the UE 100 measures the radio condition in the second network 200B. That is, the controller 130 may acquire measurement timing configuration for measurement based on a known signal in the second network 200B. The measurement timing configuration is, for example, an SSB measurement timing configuration (SMTC) window configured in the UE 100 from the base station 210B of the second network 200B. The UE 100 detects and measures the SSB within the configured SMTC window. The SMTC window is specified by respective configuration parameters of a measurement cycle, an offset, and a measurement time width of the SSB. The measurement cycle and the offset of the SSB are a cycle and an offset of a measurement window that receives the SSB, for example, given by a quantity of subframes. One measurement cycle is configured from 5, 10, 20, 80, and 160 ms, and is not necessarily the same as the actual transmission cycle of the SSB. The measurement time width (also referred to as Duration) is a time length of a measurement window for receiving the SSB, and is given by, for example, the number of subframes. One of 1, 2, 3, 4, and 5 ms (that is, 1, 2, 3, 4, and 5 subframes) is configured according to the number of SSBs to be transmitted. Note that, in a case where the base station 210B of the second network 200B is an eNB, the timing (hereinafter also referred to as a PSS/SSS window) at which the PSS and/or the SSS are transmitted can be used as the measurement timing configuration instead of the SMTC window. Then, the controller 130 generates an RRC message including an information element based on the acquired measurement timing configuration. In the first embodiment, the controller 130 generates an RRC message including the measurement timing configuration as an information element. The communicator 120 transmits the RRC message to the base station 210A of the first network 200A.

In this manner, the RRC message including the measurement timing configuration in the second network 200B is transmitted from the UE 100 to the base station 210A. Thus, the base station 210A can grasp a measurement timing at which the UE 100 is to measure the radio condition of the second network 200B. Consequently, the base station 210A can determine an appropriate interruption timing in consideration of the measurement timing of the radio condition of the second network 200B by the UE 100.

In the first embodiment, after transmitting the RRC message including the measurement timing configuration, the communicator 120 receives an RRC reconfiguration message from the base station 210A, the RRC reconfiguration message including an interruption timing configuration indicating a timing at which communication with the base station 210A is interrupted. The RRC reconfiguration message may be a 5G/NR RRCReconfiguration message or a 4G/LTE RRCConnectionReconfiguration message. The controller 130 interrupts the communication with the base station 210A and measures the radio condition of the second network 200B according to the interruption timing configuration received from the base station 210A.

Thus, the UE 100 can measure the radio condition of the second network 200B using the interruption timing configuration in consideration of the measurement timing configuration of the second network 200B. Therefore, the UE 100 can interrupt the communication with the base station 210A for the minimum necessary time, and a decrease in throughput of the communication with the base station 210A can be suppressed. Then, the UE 100 can appropriately receive paging of the second network 200B by measuring the radio condition of the second network 200B and then monitoring the paging of the second network 200B.

(Configuration Example of Base Station)

A configuration example of the base station 210A of the first network 200A will be described with reference to FIG. 4.

Figure 4:
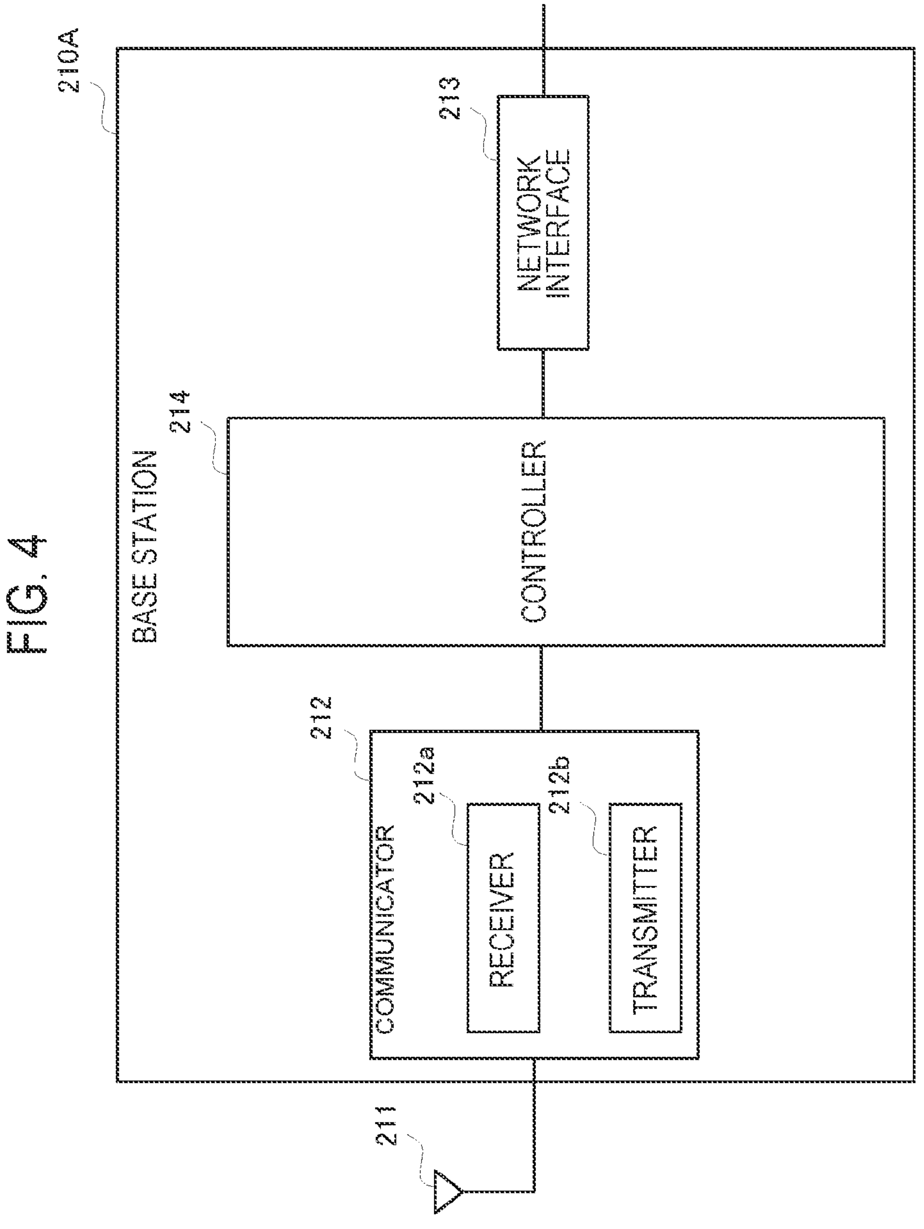
FIG. 4 is a diagram illustrating a configuration example of a base station of a first network according to the first and second embodiments.

As illustrated in FIG. 4, the base station 210A includes an antenna 211, a communicator 212, a network interface 213, and a controller 214.

The communicator 212 communicates with the UE 100 via the antenna 211 under the control of the controller 214. The communicator 212 includes a receiver 212*a* and a transmitter 212*b*. The receiver 212*a* converts a radio signal received by the antenna 211 into a received signal that is a baseband signal, performs signal processing on the received signal, and outputs the signal to the controller 214. The transmitter 212*b* performs signal processing on a transmission signal that is a baseband signal output from the controller 214, converts the signal into a radio signal, and transmits the radio signal from the antenna 211.

The network interface 213 is connected to the core network 220A. The network interface 213 performs network communication with the mobility management apparatus 221A and the gateway apparatus 222A under the control of the controller 214.

The controller 214 controls the communicator 212 and performs various types of control in the base station 210A. The controller 214 includes at least one processor and at least one memory. The memory stores a program executed by the processor and information used for processing by the processor. The memory may include at least one of a ROM, an EPROM, an EEPROM, a RAM, and a flash memory. The processor may include a digital signal processor (DSP) that performs digital processing of the digital signals and a central processing unit (CPU) that executes programs. Note that a part of the memory may be provided in the communicator 212. In addition, the DSP may be provided in the communicator 212.

In the base station 210A configured as described above, the communicator 212 receives, from the UE 100, the RRC message including the information element based on the measurement timing configuration indicating the timing at which the UE 100 measures the radio condition in the second network 200B. The controller 214 acquires an information element included in the RRC message. Thus, the controller 214 can grasp the measurement timing at which the UE 100 is to measure the radio condition of the second network 200B. Consequently, the controller 214 can determine an appropriate interruption timing in consideration of the measurement timing of the radio condition of the second network 200B by the UE 100.

In the first embodiment, after receiving the RRC message including the measurement timing configuration, the communicator 212 transmits the RRC reconfiguration message including the interruption timing configuration indicating the timing at which the communication with the base station 210A is interrupted to the UE 100. Thus, the UE 100 can measure the radio condition of the second network 200B using the interruption timing configuration in consideration of the measurement timing configuration of the second network 200B.

The interruption timing configuration to be configured in the UE 100 includes, for example, an interruption cycle which is a cycle of the interruption timing and an interruption time width which is a time width of the interruption timing, as configuration parameters. When the measurement gap is used as the interruption timing, a measurement gap configuration can be used as the interruption timing configuration. Such a measurement gap configuration may include a measurement gap cycle which is a cycle of the measurement gap and a measurement gap time width which is a time width of the measurement gap, as configuration parameters.

(Operation of Mobile Communication System)

An operation of the mobile communication system 1 will be described with reference to FIGS. 5 to 9.

(1) Operation Example of UE

An operation example of the UE 100 in which the interruption timing is configured from the base station 210A of the first network 200A will be described with reference to FIG. 5.

In the operation example illustrated in FIG. 5, the UE 100 is in the RRC connected state with respect to the first network 200A, and is in the RRC idle state or the RRC inactive state with respect to the second network 200B. In addition, it is assumed that the base station 210B of the second network 200B is a gNB. Thus, the measurement of the radio condition of the second network 200B is the measurement of the SSB.

As illustrated in FIG. 5, a period from time t1 to time t2 and a period from time t3 to time t4 correspond to the interruption timing at which the UE 100 interrupts communication with the base station 210A. Here, an example is illustrated in which the measurement gap is configured as an interruption timing using the radio condition of the second network 200B for measurement.

The controller 130 of the UE 100 switches the target from which the communicator 120 receives the radio signal from the first network 200A to the second network 200B within each interruption timing, and performs the measurement on the SSB of the second network 200B. Thus, the controller 130 of the UE 100 establishes synchronization with the second network 200B and measures the reception quality.

The controller 130 of the UE 100 may monitor paging of the second network 200B after measuring the SSB of the second network 200B within each interruption timing. In the monitoring of paging, whether or not there is paging addressed to the UE 100 is confirmed by receiving a physical downlink control channel (PDCCH) from the base station 210B of the second network 200B. Here, the UE 100 intermittently monitors paging using discontinuous reception (DRX) in order to reduce power consumption. Such a cycle of monitoring paging is referred to as a DRX cycle. In addition, a frame in which the UE 100 is to monitor paging is referred to as a paging frame (PF), and a subframe in which the UE 100 is to monitor paging among the PF is referred to as a paging occasion (PO).

Thus, it is conceivable that the interruption timing is a period including a timing of PF/PO configured in the UE 100 and an SSB measurement timing (for example, the SMTC window) immediately before the PF/PO. However, the UE 100 is not necessarily required to perform the SSB measurement for every PF/PO. For example, when the UE 100 can maintain a measurement result (including a synchronization state) of the second network 200B even while communicating with the first network 200A, the UE 100 may perform the SSB measurement at a cycle longer than the DRX cycle. Thus, the interruption timing for the SSB measurement and the interruption timing for paging monitoring may be separately configured.

Further, the interruption timing at which the communication with the base station 210A is interrupted is not limited to a case where it is configured in the UE 100 as the measurement gap. The interruption timing of interrupting the communication with the base station 210A may be configured using a DRX (C-DRX) parameter for the RRC connected state. For example, the base station 210A configures On Duration and the DRX cycle in the UE 100 so that the period from time t2 to time t3 in FIG. 5 is On Duration that is a receiving-on period, and the period from time t1 to time t2 and the period from time t3 to time t4 are a receiving-off period. The UE 100 performs SSB measurement and paging monitoring of the second network 200B in the reception off period configured from the base station 210A. Thus, the interruption timing may be configured as a measurement gap and/or a receiving-off period of DRX.

(2) First Operation Example of First Embodiment

A first operation example of the first embodiment will be described with reference to FIG. 6.

Steps S101 and S102:

The base station 210B (communicator 212) of the second network 200B transmits a message including the measurement timing configuration in the second network 200B (step S101).

The message including the measurement timing configuration in the second network 200B may be a system information block (SIB) broadcast from the base station 210B. The UE 100 can receive the SIB not only when being in the RRC connected state with respect to the second network 200B, but also when being in the RRC idle state or the RRC inactive state with respect to the second network 200B. Such an SIB may be an SIB used to control cell reselection of the UE 100 in the RRC idle state or the RRC inactive state, for example, an SIB type 2 or an SIB type 4 of 5G/NR. The SIB type 2 is an SIB for intra-frequency cell reselection. The SIB type 4 is an SIB for inter-frequency cell reselection. The UE 100 (communicator 120) receives such an SIB. The UE 100

(controller 130) acquires the measurement timing configuration included in the SIB (step S102).

The message including the measurement timing configuration in the second network 200B may be an RRC release message transmitted from the base station 210B to the UE 100. The RRC release message is a type of RRC message, and is a message for causing the UE 100 to transition from the RRC connected state to the RRC idle state or the RRC inactive state. By notifying the measurement timing configuration in the RRC release message to the UE 100, the base station 210B can configure the measurement timing optimized for each UE in the UE 100. The UE 100 (communicator 120) receives such an RRC release message. The UE 100 (controller 130) acquires the measurement timing configuration included in the RRC release message (step S102).

Note that the measurement timing configuration is not limited to the SMTC window or the PSS/SSS window described above. The measurement timing configuration is only required to be configuration information indicating a timing at which the UE 100 measures the radio condition in the second network 200B. The measurement timing configuration includes at least one of a measurement cycle, an offset, and a measurement time width as configuration parameters.

Step S103:

The UE 100 (controller 130) generates the RRC message including the measurement timing configuration acquired in step S102. Then, the UE 100 (communicator 120) transmits the RRC message including the measurement timing configuration to the base station 210A of the first network 200A (step S103).

Here, the RRC message transmitted from the UE 100 to the base station 210A in step S103 may be a message used for establishing, re-establishing, or resuming the RRC connection with the base station 210A. That is, the RRC message transmitted from the UE 100 to the base station 210A may be a message transmitted in association with a random access procedure for the UE 100 to transition from the RRC idle state or the RRC inactive state to the RRC connected state. The UE 100 notifies the measurement timing configuration to the base station 210A in such an RRC message. Thus, the base station 210A can grasp the measurement timing configuration of the UE 100 at the start of communication between the UE 100 and the base station 210A. Note that the RRC message for establishing the RRC connection with the base station 210A may be a 5G/NR RRCSetupComplete message or a 4G/LTE RRCConnectionSetupComplete message. The RRC message for reestablishing the RRC connection with the base station 210A may be an RRCReestablishmentComplete message of 5G/NR or an RRCConnectionReestablishmentComplete message of 4G/LTE. The RRC message for resuming the RRC connection with the base station 210A may be an RRCResumeComplete message.

The RRC message transmitted from the UE 100 to the base station 210A in step S103 may be an assistance information message transmitted by the UE 100 to the base station 210A as assistance information after the UE 100 establishes, re-establishes, or resumes the RRC connection with the base station 210A. That is, the RRC message transmitted from the UE 100 to the base station 210A may be a message spontaneously transmitted after the UE 100 transitions to the RRC connected state. The UE 100 notifies the measurement timing configuration to the base station 210A in such an RRC message. Thus, when the UE 100 determines that measurement and/or paging monitoring of the second network 200B is necessary, it is possible to prompt the base station 210A to configured the interruption timing. Note that such an assistance information message may be a UEAssistanceInformation message and/or an RRC message (for example, Multi SIMUEInformation message) newly defined for a multi-SIM support UE.

The RRC message transmitted from the UE 100 to the base station 210A in step S103 may be a response message (for example, the UEInformationResponse message) transmitted by the UE 100 in response to a transmission request from the base station 210A after the UE 100 establishes, re-establishes, or resumes the RRC connection with the base station 210A of the first network 200A. The UE 100 may transmit a message used for establishing, re-establishing, or resuming the RRC connection with the base station 210A by including information indicating that the measurement timing configuration to be transmitted to the base station 210A is included. The base station 210A transmits a message (for example, the UEInformationRequest message) requesting transmission of the measurement timing configuration to the UE 100 on the basis of the information. In response to the request message, the UE 100 transmits a response message including the measurement timing configuration to the base station 210A. The UE 100 notifies the measurement timing configuration to the base station 210A in such a response message. Thus, the base station 210A can perform control to request the UE 100 for the measurement timing configuration only when the base station 210A can configure the interruption timing.

The RRC message transmitted from the UE 100 to the base station 210A in step S103 includes the measurement timing configuration as an information element, but may further include other information elements that may be useful for the base station 210A to determine the interruption timing. For example, the RRC message transmitted from the UE 100 to the base station 210A in step S103 may further include at least one information element among the following (A1) to (A5).

(A1) PLMN ID of the second network 200B (A2) Base station ID of the base station 210B (A3) Cell ID of the cell C2 (that is, the camp-on cell on which the UE 100 waits) of the base station 210B (A4) Frequency ID of the frequency to which the cell belongs (A5) Information requesting configuration of the interruption timing The base station 210A (communicator 212) may broadcast information indicating that transmission of the measurement timing configuration by the UE 100 is permitted by including the information in, for example, the SIB. The UE 100 (communicator 120) may be able to transmit the measurement timing configuration to the base station 210A only when the base station 210A permits transmission of the measurement timing configuration.

The base station 210A (communicator 212) may broadcast information indicating that acquisition and transmission of the measurement timing configuration by the UE 100 are requested by including the information in, for example, the SIB. The UE 100 (communicator 120) may transmit the measurement timing configuration to the base station 210A in response to the base station 210A requesting acquisition and transmission of the measurement timing configuration.

Step S104:

The base station 210A (controller 214) determines an interruption timing to be configured in the UE 100 on the basis of the measurement timing configuration received from the UE 100. For example, the base station 210A (controller 214) determines the cycle and the time width of the interruption timing so as to cover the timing at which the UE 100 performs the measurement of the second network 200B. The base station 210A (controller 214) generates the RRC reconfiguration message including the interruption timing configuration indicating the determined interruption timing.

Step S105:

The base station 210A (communicator 212) transmits the RRC reconfiguration message including the interruption timing configuration to the UE 100. The UE 100 (communicator 120) receives the RRC reconfiguration message. The UE 100 (controller 130) stores and applies the interruption timing configuration included in the received RRC reconfiguration message. Note that, when the measurement gap is used as the interruption timing, the interruption timing configuration may include a measurement gap parameter set for specifying the measurement gap. The measurement gap parameter set may include gapOffset, mgl, mgrp, and mgta. The mgl is a measurement gap length of the measurement gap. The mgrp is a measurement gap repetition period (MGRP) of the measurement gap. The mgta is measurement gap timing advance. The gapOffset is the gap offset of the gap pattern with MGRP.

Step S106:

The UE 100 (communicator 120) transmits, to the base station 210A, an RRC reconfiguration completion message indicating that the configuration is completed by the RRC reconfiguration message from the base station 210A. The base station 210A (communicator 212) receives the RRC reconfiguration completion message.

Step S107:

The base station 210A (controller 214) allocates radio resources to the UE 100 and communicates with the UE 100 at a timing other than the interruption timing configured in the UE 100. The UE 100 (controller 130) monitors the PDCCH of the base station 210A at a timing other than the interruption timing configured from the base station 210A and communicates with the base station 210A.

Step S108:

The base station 210A (controller 214) does not allocate radio resources to the UE 100 and interrupts communication with the UE 100 at the interruption timing configured in the UE 100. The UE 100 (controller 130) interrupts the communication with the base station 210A and measures the radio condition of the second network 200B at the interruption timing configured from the base station 210A.

(3) Second Operation Example of First Embodiment

A second operation example of the first embodiment will be described focusing on differences from the first operation example of the first embodiment.

In the second operation example of the first embodiment, the communicator 120 of the UE 100 receives at least one of the MIB and the SIB broadcast from the base station 210B of the second network 200B, and the controller 130 of the UE 100 acquires a signal transmission configuration included in at least one of the MIB and the SIB. The signal transmission configuration indicates a timing at which the base station 210B of the second network 200B transmits at least one of a synchronization signal and a reference signal. The controller 130 of the UE 100 acquires the measurement timing configuration generated on the basis of the signal transmission configuration. Thus, the UE 100 can generate and acquire the measurement timing configuration from the signal transmission configuration of the base station 210B even if the measurement timing configuration is not explicitly configured from the base station 210B.

The second operation example of the first embodiment will be described with reference to FIG. 7.

Steps S111 and S112:

The base station 210B (communicator 212) of the second network 200B transmits a message including the signal transmission configuration in the second network 200B (step S111). The UE 100 (controller 130) acquires the signal transmission configuration included in the message from the base station 210B (step S112).

For example, in a case of 5G/NR, the signal transmission configuration is at least one of the following (B1) to (B3).

(B1) subCarrierSpacingCommon included in MIB broadcast from the base station 210B (B2) ssb-PeriodicityServingCell included in an SIB type 1 broadcast from the base station 210B (B3) ssb-PositionsInBurst included in the SIB type 1 broadcasted from the base station 210B The subCarrierSpacingCommon is information element indicating subcarrier spacing. The ssb-PeriodicityServingCell is an information element indicating a transmission cycle of the SSB. The ssb-PositionsInBurst is an information element indicating the position of the SSB in the time domain.

Step S113:

The UE 100 (controller 130) acquires the measurement timing configuration generated on the basis of the signal transmission configuration acquired in step S112. For example, the UE 100 (controller 130) generates information corresponding to the SMTC window from the signal transmission configuration acquired in step S112, and uses the generated information as the measurement timing configuration.

Step S114:

The UE 100 (controller 130) generates the RRC message including the measurement timing configuration acquired in step S112. Then, the UE 100 (communicator 120) transmits the RRC message including the measurement timing configuration to the base station 210A of the first network 200A (step S114).

Steps S115 to S119:

These steps are similar to steps S104 to S108 in the first operation example of the first embodiment.

(4) Third Operation Example of First Embodiment

A third operation example of the first embodiment will be described focusing on differences from the first operation example of the first embodiment.

In the third operation example of the first embodiment, the controller 130 of the UE 100 further acquires a paging parameter set for specifying a timing (that is, PF/PO) at which the UE 100 monitors paging in the second network 200B. The communicator 120 of the UE 100 transmits the RRC message further including the paging parameter set as another information element to the base station 210A. That is, the paging parameter set is further included in the RRC message transmitted in step S103 of the first operation example of the first embodiment illustrated in FIG. 6. Thus, the base station 210A can grasp the timing at which the UE 100 is to perform paging monitoring of the second network 200B. Consequently, the base station 210A can determine an appropriate interruption timing in consideration of the paging monitoring timing of the second network 200B by the UE 100.

In the third operation example of the first embodiment, the communicator 120 of the UE 100 receives the RRC reconfiguration message including the interruption timing configuration from the base station 210A after transmitting the RRC message. The interruption timing configuration indicates a timing at which communication with the base station 210A is interrupted for measurement of the radio condition and monitoring of paging. The controller 130 of the UE 100 interrupts communication with the base station 210A according to the interruption timing configuration, and performs measurement of the radio condition and monitoring of paging. Thus, the UE 100 can monitor the paging of the second network 200B using the interruption timing configuration in which the paging parameter set of the second network 200B is considered. Therefore, the UE 100 can interrupt the communication with the base station 210A for the minimum necessary time for measurement of the radio condition of the second network 200B and the paging monitoring, and a decrease in throughput of the communication with the base station 210A can be suppressed.

Figure 8:
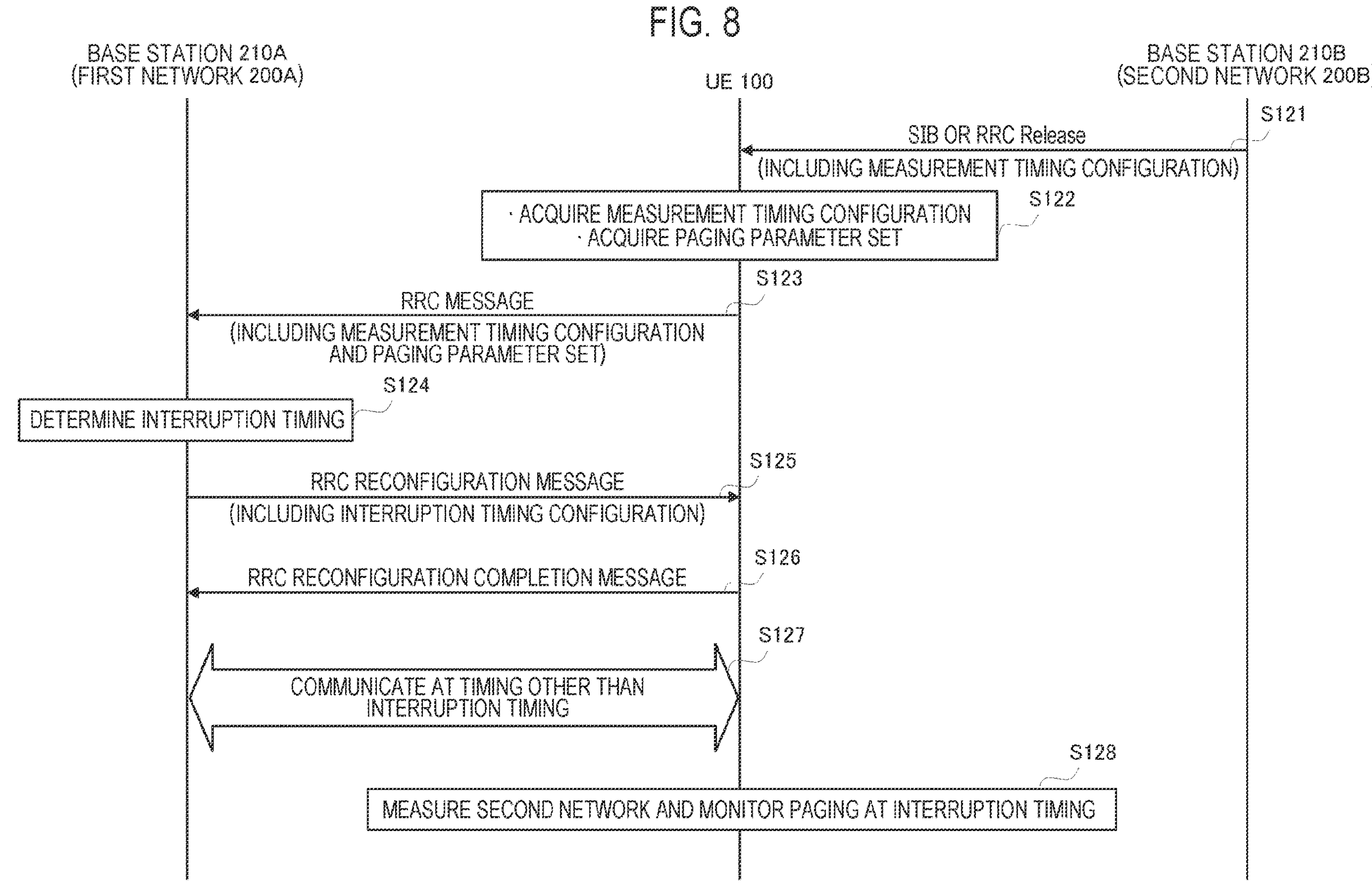
FIG. 8 is a diagram illustrating a third operation example of the first embodiment.

The third operation example of the first embodiment will be described with reference to FIG. 8.

Steps S121 and S122:

The base station 210B (communicator 212) of the second network 200B transmits a message including the measurement timing configuration in the second network 200B (step S121). The UE 100 (controller 130) acquires the measurement timing configuration included in the message from the base station 210B (step S122).

In the third operation example of the first embodiment, the UE 100 (controller 130) acquires not only the measurement timing configuration but also the paging parameter set (step S122).

For example, the paging parameter set includes a parameter set for specifying PF and PO of paging in the second network 200B. First, the paging parameter set may include configuration information for paging. The configuration information may be paging control channel (PCCH)-Config. The configuration information is included in system information transmitted in the second network 200B. The UE 100 (communicator 120) receives the system information in the second network 200B. Then, the UE 100 (controller 130) acquires the configuration information included in the system information.

Secondly, the paging parameter set includes the ID of the UE 100 in the second network 200B. For example, in a case where the base station 210B of the second network 200B is a gNB, the ID is the least significant 10 bits of 5G-S-TMSI (temporary mobile subscriber identity) of the UE 100 in the second network 200B or the 5G-STMSI. When the base station 210B of the second network 200B is the eNB, the ID is the IMSI of the UE 100 in the second network 200B or the least significant 10 bits of the Here, a method of determining PF and PO will be described. For 5G/NR, PF is determined by the following equation:

$$(SFN+PF\_offset) \bmod T=(T \text{ div} N)*(UE\_ID \bmod N)$$

The SFN is a system frame number (SFN) of PF. The PF_offset is an offset used to determine PF. The T is a discontinuous reception (DRX) cycle of the UE 100. UE_ID is the least significant 10 bits of 5G-STMSI. The N is the total number of PFs in T. For example, T is indicated by the defaultPagingCycle included in PCCH-Config. For example, N and PF_offset are indicated by nAndPagingFrameOffset included in PCCH-Config.

For 5G/NR, PO is determined by the following equation:

$$i\_s=\text{floor}(UE\_ID/N) \bmod Ns$$

The i_s indicates an index of PO. The UE_ID is the least significant 10 bits of the 5G-S-TMSI. N is the total number of PFs in T. The T is a DRX cycle of the UE 100. The Ns is the number of POs for PF. For example, N is indicated by nAndPagingFrameOffset included in PCCH-Config. Ns is indicated by ns included in PCCH-Config. PO is associated with PF. For example, PO starts in or after PF.

For 4G/LTE, PF is determined by the following expression:

$$SFN \bmod T=(T \text{ div } N)*(UE\_ID \text{ modN})$$

The SFN is SFN of PF. The T is a DRX cycle of the UE 100. The N is a smaller one of T and nB. The nB is a parameter to be configured. The UE_ID is the least significant 10 bits of the IMSI. For example, T is indicated by the defaultPagingCycle included in PCCH-Config. nB is indicated by nB included in PCCH-Config.

For 4G/LTE, PO is determined by the following expression:

$$i\_s=\text{floor}(UE\_ID/N) \bmod Ns$$

The i_s indicates an index of PO. The UE_ID is the least significant 10 bits of the IMSI. The N is a smaller one of T and nB. The T is a DRX cycle of the UE 100, and nB is a configured parameter. The Ns is the larger of 1 and nB/T. For example, T is indicated by the defaultPagingCycle included in PCCH-Config. nB is indicated by nB included in PCCH-Config.

Step S123:

The UE 100 (controller 130) generates the RRC message including the measurement timing configuration and the paging parameter set acquired in step S122. Then, the UE 100 (communicator 120) transmits the RRC message including the measurement timing configuration and the paging parameter set to the base station 210A of the first network 200A (step S123).

Step S124:

The base station 210A (controller 214) determines an interruption timing to be configured in the UE 100 on the basis of the measurement timing configuration and the paging parameter set received from the UE 100. The base station 210A (controller 214) determines the cycle and the time width of the interruption timing so as to cover the timing at which the UE 100 performs the measurement of the second network 200B (for example, the SMTC window) and the timing at which the paging is monitored (for example, PF/PO). The base station 210A (controller 214) generates the RRC reconfiguration message including the interruption timing configuration indicating the determined interruption timing.

Step S125:

The base station 210A (communicator 212) transmits the RRC reconfiguration message including the interruption timing configuration to the UE 100. The UE 100 (communicator 120) receives the RRC reconfiguration message. The UE 100 (controller 130) stores and applies the interruption timing configuration included in the received RRC reconfiguration message.

Step S126:

The UE 100 (communicator 120) transmits, to the base station 210A, an RRC reconfiguration completion message indicating that the configuration is completed by the RRC reconfiguration message from the base station 210A. The base station 210A (communicator 212) receives the RRC reconfiguration completion message.

Step S127:

The base station 210A (controller 214) allocates radio resources to the UE 100 and communicates with the UE 100 at a timing other than the interruption timing configured in the UE 100. The UE 100 (controller 130) monitors the PDCCH of the base station 210A at a timing other than the interruption timing configured from the base station 210A and communicates with the base station 210A.

Step S128:

The base station 210A (controller 214) does not allocate radio resources to the UE 100 and interrupts communication with the UE 100 at the interruption timing configured in the UE 100. The UE 100 (controller 130) interrupts the communication with the base station 210A, measures the radio condition of the second network 200B, and monitors paging of the second network 200B at the interruption timing configured from the base station 210A.

(5) Fourth Operation Example of First Embodiment

A fourth operation example of the first embodiment will be described focusing on differences from the first operation example of the first embodiment.

In the fourth operation example of the first embodiment, after transmitting the RRC message including the measurement timing configuration and the paging parameter set, the communicator 120 of the UE 100 receives an RRC reconfiguration message including a first interruption timing configuration and a second interruption timing configuration from the base station 210A. The first interruption timing configuration indicates a timing at which communication with the base station 210A is interrupted for measurement of the radio condition. The second interruption timing configuration indicates a timing at which communication with the base station 210A is interrupted for monitoring paging. The controller 130 of the UE 100 interrupts the communication with the base station 210A and measures the radio condition of the second network 200B according to the first interruption timing configuration, and interrupts the communication with the base station 210A and monitors paging of the second network 200B according to the second interruption timing configuration. Thus, the interruption timing for radio condition measurement and the interruption timing for paging monitoring can be configured separately.

Figure 9:
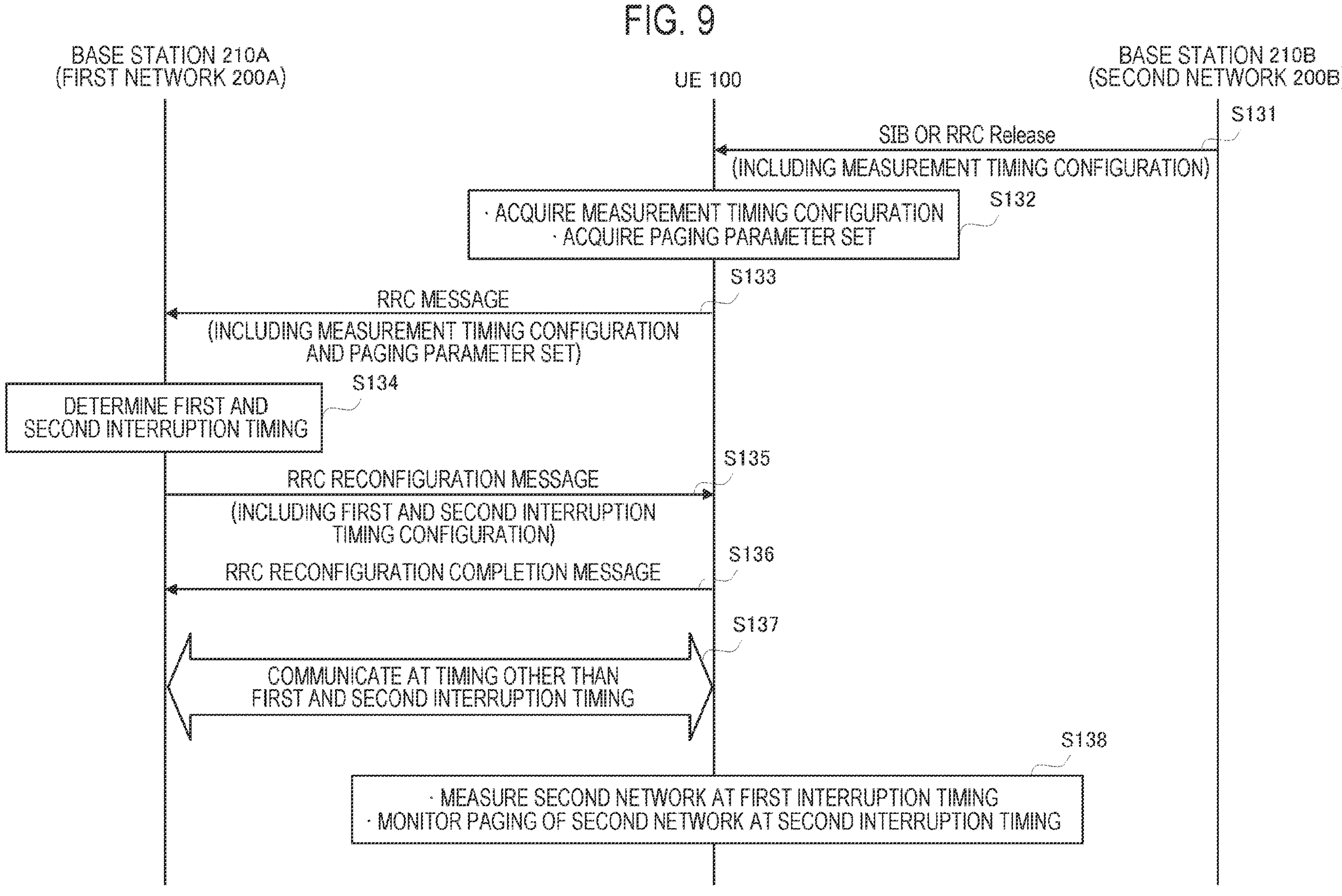
FIG. 9 is a diagram illustrating a fourth operation example of the first embodiment.

A fourth operation example of the first embodiment will be described with reference to FIG. 9.

Steps S131 and S132:

The base station 210B (communicator 212) of the second network 200B transmits a message including the measurement timing configuration in the second network 200B (step S131). The UE 100 (controller 130) acquires the measurement timing configuration included in the message from the base station 210B (step S132). In the fourth operation example of the first embodiment, the UE 100 (controller 130) acquires not only the measurement timing configuration but also the paging parameter set as in the third operation example of the first embodiment (step S132).

Step S133:

The UE 100 (controller 130) generates the RRC message including the measurement timing configuration and the paging parameter set acquired in step S132. Then, the UE 100 (communicator 120) transmits the RRC message including the measurement timing configuration and the paging parameter set to the base station 210A of the first network 200A (step S133).

Step S134:

The base station 210A (controller 214) determines an interruption timing to be configured in the UE 100 on the basis of the measurement timing configuration and the paging parameter set received from the UE 100. The base station 210A (controller 214) determines the first interruption timing so as to cover the timing at which the UE 100 performs the measurement of the second network 200B (for example, the SMTC window). Further, the base station 210A (controller 214) determines the second interruption timing so as to cover the timing at which the UE 100 performs paging monitoring of the second network 200B (for example, PF/PO). The base station 210A (controller 214) generates the RRC reconfiguration message including the first interruption timing configuration indicating the determined first interruption timing and the second interruption timing configuration indicating the determined second interruption timing.

Step S135:

The base station 210A (communicator 212) transmits the RRC reconfiguration message including the first interruption timing configuration and the second interruption timing configuration to the UE 100. The first interruption timing configuration and the second interruption timing configuration are included in the RRC reconfiguration message as mutually different information elements. The UE 100 (communicator 120) receives the RRC reconfiguration message. The UE 100 (controller 130) stores and applies the first interruption timing configuration and the second interruption timing configuration included in the received RRC reconfiguration message.

Step S136:

The UE 100 (communicator 120) transmits, to the base station 210A, an RRC reconfiguration completion message indicating that the configuration is completed by the RRC reconfiguration message from the base station 210A. The base station 210A (communicator 212) receives the RRC reconfiguration completion message.

Step S137:

The base station 210A (controller 214) allocates radio resources to the UE 100 and communicates with the UE 100 at timings other than the first interruption timing and the second interruption timing configured in the UE 100. The UE 100 (controller 130) monitors the PDCCH of the base station 210A at a timing other than the first interruption timing and the second interruption timing configured from the base station 210A, and communicates with the base station 210A.

Step S138:

The base station 210A (controller 214) does not allocate radio resources to the UE 100 at the first interruption timing and the second interruption timing configured in the UE 100, and interrupts communication with the UE 100. The UE 100 (controller 130) interrupts the communication with the base station 210A and measures the radio condition of the second network 200B at the first interruption timing configured from the base station 210A. Further, the UE 100 (controller 130) interrupts the communication with the base station 210A and monitors paging of the second network 200B at the second interruption timing configured from the base station 210A.

(Summary of First Embodiment)

As described above, the RRC message including the measurement timing configuration in the second network 200B is transmitted from the UE 100 to the base station 210A of the first network 200A. Thus, the base station 210A can grasp a measurement timing at which the UE 100 is to measure the radio condition of the second network 200B. Consequently, the base station 210A can determine an appropriate interruption timing in consideration of the measurement timing of the radio condition of the second network 200B by the UE 100.

Second Embodiment

A second embodiment will be described focusing on differences from the first embodiment. The configuration as a premise of operation according to a second embodiment is similar to that of the first embodiment.

(Operation of Mobile Communication System)

An operation of the mobile communication system 1 according to the second embodiment will be described with reference to FIGS. 10 to 13.

In the second embodiment, the controller 130 of the UE 100 determines an interruption timing pattern indicating a timing at which communication with the base station 210A is interrupted to measure the radio condition on the basis of the measurement timing configuration. The communicator 120 of the UE 100 transmits an RRC message including information indicating the determined interruption timing pattern as an information element to the base station 210A. That is, in the second embodiment, the base station 210A does not determine the interruption timing, but the UE 100 determines the interruption timing on the basis of the measurement timing configuration, and the UE 100 notifies the determined interruption timing to the base station 210A. Thus, the interruption timing optimized according to the capability and/or situation of the UE 100 can be determined.

(1) First Operation Example of Second Embodiment

A first operation example of the second embodiment will be described with reference to FIG. 10.

Steps S201 and S202:

The base station 210B (communicator 212) of the second network 200B transmits a message including the measurement timing configuration in the second network 200B (step S201). The UE 100 (controller 130) acquires the measurement timing configuration included in the message (step S202).

As in the first embodiment, the message including the measurement timing configuration in the second network 200B may be an SIB broadcast from the base station 210B or an RRC release (RRC Release) message transmitted from the base station 210B to the UE 100.

Note that the measurement timing configuration is not limited to the SMTC window or the PSS/SSS window described above. The measurement timing configuration is only required to be configuration information indicating a timing at which the UE 100 measures the radio condition in the second network 200B. The measurement timing configuration includes at least one of a measurement cycle, an offset, and a measurement time width as configuration parameters.

Step S203:

The UE 100 (controller 130) determines the interruption timing pattern indicating an interruption timing at which the communication with the base station 210A is interrupted on the basis of the measurement timing configuration acquired in step S202. For example, the UE 100 (controller 130) determines the cycle and the time width of the interruption timing so as to cover the timing at which the UE 100 performs the measurement of the second network 200B.

Step S204:

The UE 100 (controller 130) generates the RRC message including the information indicating the interruption timing pattern determined in step S203 as the information element. Then, the UE 100 (communicator 120) transmits the RRC message to the base station 210A of the first network 200A (step S204).

The RRC message transmitted from the UE 100 to the base station 210A in step S203 may be any one of the following (C1) to (C3) as in the first embodiment.

(C1) Message used for establishing, re-establishing, or resuming the RRC connection with the base station 210A (C2) Assistance information message that is transmitted as assistance information by the UE 100 to the base station 210A after the UE 100 establishes, re-establishes, or resumes the RRC connection with the base station 210A.

(C3) Response message that is transmitted by the UE 100 in response to a transmission request from the base station 210A after the UE 100 establishes, re-establishes, or resumes the RRC connection with the base station 210A of the first network 200A.

The RRC message transmitted from the UE 100 to the base station 210A in step S204 includes information indicating an interruption timing pattern as an information element, but may further include another information element. For example, the RRC message transmitted from the UE 100 to the base station 210A in step S204 may further include at least one information element among the following (D1) to (D5).

(D1) PLMN ID of the second network 200B (D2) Base station ID of the base station 210B (D3) Cell ID of the cell C2 (that is, the camp-on cell on which the UE 100 waits) of the base station 210B (D4) Frequency ID of the frequency to which the cell belongs (D5) Information requesting configuration of the interruption timing The base station 210A (communicator 212) may broadcast information indicating that the determination of the interruption timing pattern by the UE 100 is permitted by including the information in, for example, the SIB. The UE 100 (communicator 120) may be able to determine the interruption timing pattern only when the base station 210A permits configuration of the measurement timing configuration.

Steps S205 and S206:

The base station 210A (communicator 212) may transmit the RRC reconfiguration message including the interruption timing configuration based on the interruption timing pattern determined by the UE 100 to the UE 100 (step S205). In this case, when the UE 100 (communicator 120) receives the RRC reconfiguration message, the UE 100 (controller 130) stores and applies the interruption timing configuration included in the received RRC reconfiguration message. In addition, the UE 100 (communicator 120) may transmit an RRC reconfiguration completion message indicating that the configuration by the RRC reconfiguration message from the base station 210A is completed to the base station 210A (step S206). Note that steps S205 and S206 are not essential and can be omitted.

Step S207:

The base station 210A (controller 214) allocates radio resources to the UE 100 and communicates with the UE 100 at a timing other than the interruption timing. The UE 100 (controller 130) monitors the PDCCH of the base station 210A at a timing other than the interruption timing and communicates with the base station 210A.

Step S208:

The base station 210A (controller 214) does not allocate radio resources to the UE 100 at the interruption timing, and interrupts communication with the UE 100. The UE 100 (controller 130) interrupts the communication with the base station 210A and measures the radio condition of the second network 200B at the interruption timing.

(2) Second Operation Example of Second Embodiment

A second operation example of the second embodiment will be described focusing on differences from the first operation example of the second embodiment.

In the second operation example of the first embodiment, the communicator 120 of the UE 100 receives at least one of the MIB and the SIB broadcast from the base station 210B of the second network 200B, and the controller 130 of the UE 100 acquires a signal transmission configuration included in at least one of the MIB and the SIB. The signal transmission configuration indicates a timing at which the base station 210B of the second network 200B transmits at least one of a synchronization signal and a reference signal. The controller 130 of the UE 100 acquires the measurement timing configuration generated on the basis of the signal transmission configuration. Thus, the UE 100 can generate and acquire the measurement timing configuration from the signal transmission configuration of the base station 210B even if the measurement timing configuration is not explicitly configured from the base station 210B.

Figure 11:
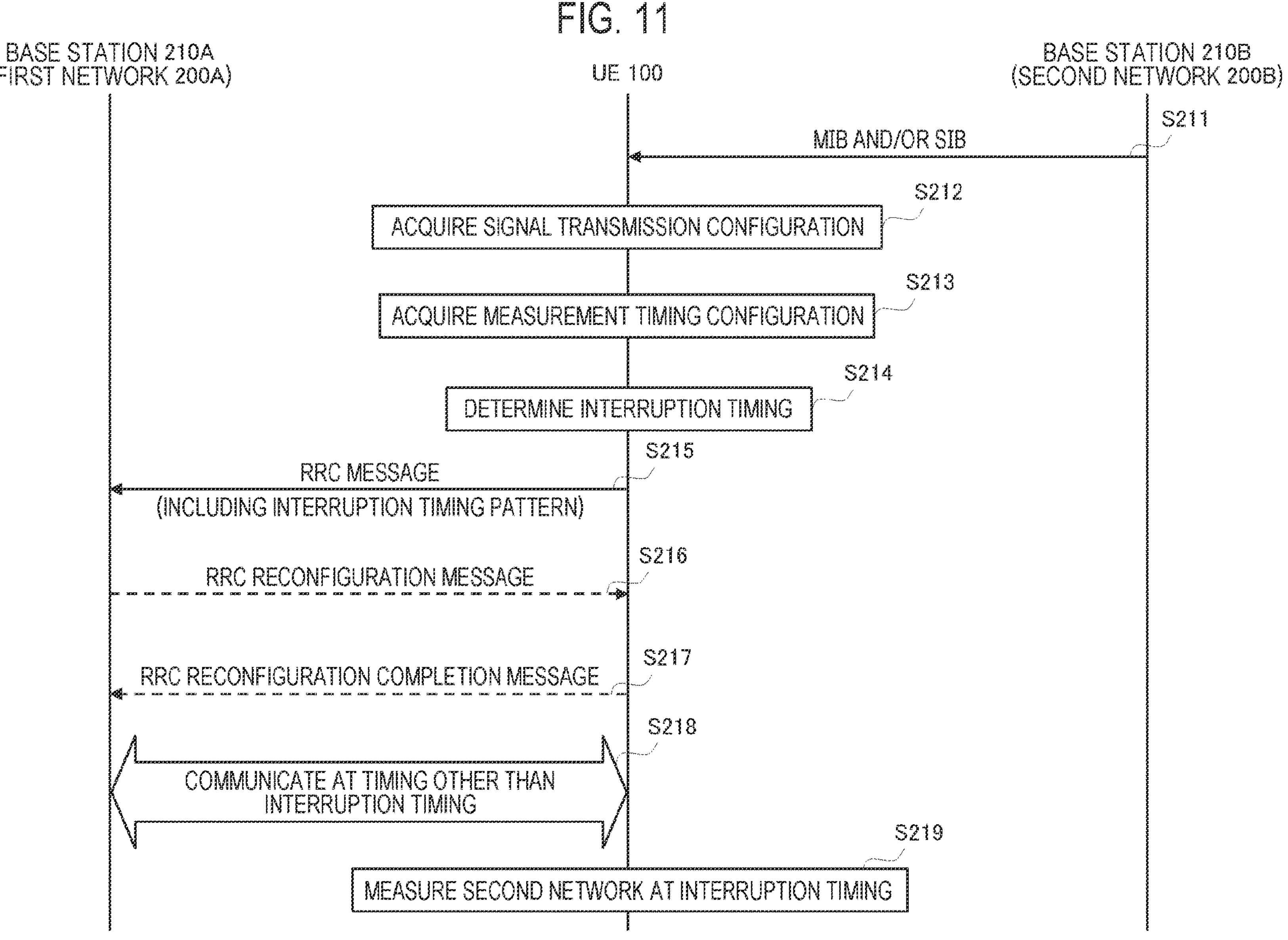
FIG. 11 is a diagram illustrating a second operation example of the second embodiment.

The second operation example of the second embodiment will be described with reference to FIG. 11.

Steps S211 and S212:

The base station 210B (communicator 212) of the second network 200B transmits a message including the signal transmission configuration in the second network 200B (step S211). The UE 100 (controller 130) acquires the signal transmission configuration included in the message from the base station 210B (step S212).

Step S213:

The UE 100 (controller 130) acquires the measurement timing configuration generated on the basis of the signal transmission configuration acquired in step S212. For example, the UE 100 (controller 130) generates information corresponding to the SMTC window from the signal transmission configuration acquired in step S212, and uses the generated information as the measurement timing configuration.

Step S214:

The UE 100 (controller 130) determines the interruption timing pattern indicating an interruption timing at which the communication with the base station 210A is interrupted on the basis of the measurement timing configuration acquired in step S213. For example, the UE 100 (controller 130) determines the cycle and the time width of the interruption timing so as to cover the timing at which the UE 100 performs the measurement of the second network 200B.

Step S215:

The UE 100 (controller 130) generates the RRC message including the information indicating the interruption timing pattern determined in step S214 as the information element. Then, the UE 100 (communicator 120) transmits the RRC message to the base station 210A of the first network 200A (step S204).

Steps S216 to S219:

These steps are similar to steps S205 to S208 in the first operation example of the second embodiment.

(3) Third Operation Example of Second Embodiment

A third operation example of the second embodiment will be described focusing on differences from the first operation example of the second embodiment.

In the third operation example of the second embodiment, the controller 130 of the UE 100 further acquires a paging parameter set for specifying a timing (that is, PF/PO) at which the UE 100 monitors paging in the second network 200B. Then, on the basis of the measurement timing configuration and the paging parameter set, the controller 130 of the UE 100 determines the interruption timing pattern indicating an interruption timing at which the communication with the base station 210A is interrupted in order to measure the radio condition and monitor paging. Thus, the UE 100 can determine an appropriate interruption timing in consideration of the paging monitoring timing of the second network 200B.

The third operation example of the second embodiment will be described with reference to FIG. 12.

Steps S221 and S222:

The base station 210B (communicator 212) of the second network 200B transmits a message including the measurement timing configuration in the second network 200B (step S221). The UE 100 (controller 130) acquires the measurement timing configuration included in the message (step S222). In the third operation example of the second embodiment, the UE 100 (controller 130) acquires not only the measurement timing configuration but also the paging parameter set (step S222). Details of the paging parameter set are similar to those of the third operation example of the first embodiment.

Step S223:

The UE 100 (controller 130) determines the interruption timing pattern indicating an interruption timing at which the communication with the base station 210A is interrupted on the basis of the measurement timing configuration and the paging parameter set acquired in step S222. For example, the UE 100 (controller 130) determines the cycle and the time width of the interruption timing so as to cover the timing at which the UE 100 performs the measurement of the second network 200B and the timing at which the paging is monitored.

Step S224:

The UE 100 (controller 130) generates the RRC message including the information indicating the interruption timing pattern determined in step S223 as the information element. Then, the UE 100 (communicator 120) transmits the RRC message to the base station 210A of the first network 200A (step S224).

Steps S225 and S226:

These steps are similar to steps S205 and S206 in the first operation example of the second embodiment.

Step S227:

The base station 210A (controller 214) allocates radio resources to the UE 100 and communicates with the UE 100 at a timing other than the interruption timing. The UE 100 (controller 130) monitors the PDCCH of the base station 210A at a timing other than the interruption timing and communicates with the base station 210A.

Step S228:

The base station 210A (controller 214) does not allocate radio resources to the UE 100 at the interruption timing, and interrupts communication with the UE 100. The UE 100 (controller 130) interrupts the communication with the base station 210A, measures the radio condition of the second network 200B, and monitors paging of the second network 200B at the interruption timing.

(4) Fourth Operation Example of Second Embodiment

A fourth operation example of the second embodiment will be described focusing on differences from the first operation example of the second embodiment.

In the fourth operation example of the second embodiment, the controller 130 of the UE 100 further acquires a paging parameter set for specifying a timing at which the UE 100 monitors paging in the second network 200B. The controller 130 of the UE 100 determines a first interruption timing pattern indicating a timing at which the communication with the base station 210A is stopped for measurement of the radio condition on the basis of the measurement timing configuration. Further, the controller 130 of the UE 100 determines a second interruption timing pattern indicating a timing at which the communication with the base station 210A is stopped for monitoring paging on the basis of the paging parameter set. Then, the communicator 120 of the UE 100 transmits the RRC message including the information indicating the first interruption timing pattern and the information indicating the second interruption timing pattern to the base station 210A. Thus, the interruption timing for radio condition measurement and the interruption timing for paging monitoring can be configured separately.

The fourth operation example of the second embodiment will be described with reference to FIG. 13.

Steps S231 and S232:

The base station 210B (communicator 212) of the second network 200B transmits a message including the measurement timing configuration in the second network 200B (step S231). The UE 100 (controller 130) acquires the measurement timing configuration included in the message from the base station 210B (step S232). In the fourth operation example of the second embodiment, the UE 100 (controller 130) acquires not only the measurement timing configuration but also the paging parameter set as in the third operation example of the second embodiment (step S232).

Step S233:

The UE 100 (controller 130) determines the first interruption timing pattern indicating the first interruption timing at which the communication with the base station 210A is stopped for measurement of the radio condition on the basis of the measurement timing configuration acquired in step S232. Further, the UE 100 (controller 130) determines the second interruption timing pattern indicating the second interruption timing at which the communication with the base station 210A is stopped for monitoring paging on the basis of the paging parameter set.

Step S234:

The UE 100 (controller 130) generates the RRC message including the information indicating the first interruption timing pattern determined in step S233 and the information indicating the second interruption timing pattern determined in step S233. Then, the UE 100 (communicator 120) transmits the RRC message to the base station 210A of the first network 200A (step S224).

Steps S235 and S236:

These steps are similar to steps S205 and S206 in the first operation example of the second embodiment.

Step S237:

The base station 210A (controller 214) allocates radio resources to the UE 100 and communicates with the UE 100 at a timing other than the first interruption timing and the second interruption timing. The UE 100 (controller 130) monitors the PDCCH of the base station 210A at a timing other than the first interruption timing and the second interruption timing, and communicates with the base station 210A.

Step S238:

The base station 210A (controller 214) does not allocate radio resources to the UE 100 at the first interruption timing and the second interruption timing, and interrupts communication with the UE 100. The UE 100 (controller 130) interrupts the communication with the base station 210A and measures the radio condition of the second network 200B at the first interruption timing. In addition, the UE 100 (controller 130) interrupts communication with the base station 210A and monitors paging of the second network 200B at the second interruption timing.

(Summary of Second Embodiment)

As described above, the UE 100 determines the interruption timing on the basis of the measurement timing configuration in the second network 200B, whereby the appropriate interruption timing can be determined in consideration of the measurement timing of the radio condition of the second network 200B by the UE 100.

OTHER EMBODIMENTS

The steps in the operations of the above-described embodiments may not necessarily be performed in chronological order according to the order described in the flow diagram or sequence diagram. For example, steps in an operation may be performed in an order different from the order described as a flow diagram or sequence diagram, or may be performed in parallel. In addition, some of the steps in the operation may be removed and additional steps may be added to the process. Furthermore, each operation flow described above is not limited to be separately and independently implemented, and can be implemented by combining two or more operation flows. For example, some steps of one operation flow may be added to another operation flow, or some steps of one operation flow may be replaced with some steps of another operation flow.

A program may be provided to cause a computer to execute the operations of the UE 100 or the base station 210. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM. The UE 100 or the base station 210 may be embodied as a semiconductor integrated circuit (chipset, SoC, etc.) by integrating the circuits that execute the respective operations of the UE 100 or the base station 210.

Note that, in the above-described embodiments, "transmit" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive" may mean to perform processing of at least one layer in the protocol stack used for reception, or may mean to physically receive a signal wirelessly or by wire. Alternatively, "receive" may mean a combination of performing the processing of at least one layer and physically receiving a signal wirelessly or by wire.

Although the present disclosure has been described in accordance with examples, it is understood that the present disclosure is not limited to the examples and structures. The present disclosure also includes various modification examples and modifications within an equivalent range. In addition, various combinations and modes, and other combinations and modes including only one element, more elements, or less elements are also within the scope and idea of the present disclosure.

The invention claimed is:

1. A communication equipment configured to communicate with a plurality of networks using a plurality of subscriber identity modules, the communication equipment comprising:

a communicator configured to communicate with a base station of a first network included in the plurality of networks, wherein:

the communicator is configured to:

receive, from the base station, first information configuring the communication equipment to transmit a UEAssistanceInformation message including second information indicating one or more gap patterns, transmit based on receiving the first information, to the base station, the UEAssistanceInformation message including the second information, the second information includes third information indicating a first gap pattern including a first gap repetition period and fourth information indicating a second gap pattern including a second gap repetition period; and the communicator is further configured to receive, from the base station, a radio resource control (RRC) reconfiguration message including a first gap configuration according to the third information and a second gap configuration according to the fourth information.

2. The communication equipment according to claim 1, wherein:

the one or more gap patterns includes a pattern of a gap for performing an operation in a second network included in the plurality of networks.

3. The communication equipment according to claim 2, wherein:

the first gap pattern includes a first gap length and a first gap offset, and the second gap pattern includes a second gap length and a second gap offset.

4. The communication equipment according to claim 2, further comprising:

a controller configured to:

perform, in the one or more gap patterns based on the first gap configuration and the second gap configuration, monitoring of a paging in the second network;

perform, in the one or more gap patterns based on the first gap configuration and the second gap configuration, a measurement in the second network;

not perform, in a duration other than the one or more gap patterns based on the first gap configuration and the second gap configuration, the monitoring of the paging in the second network; and not perform, in the duration other than the one or more gap patterns based on the first gap configuration and the second gap configuration, the measurement in the second network.

5. The communication equipment according to claim 4, wherein:

the first gap repetition period corresponds to a period for the communication equipment to monitor the paging in the second network, and the second gap repetition period corresponds to a period for the communication equipment to measure a radio condition in the second network.

6. A base station of a first network, comprising:

a transmitter configured to transmit to communication equipment, first information configuring the communication equipment to transmit second information indicating one or more gap patterns, and a receiver configured to receive, based on transmitting the first information, from the communication equipment, a UEAssistanceInformation message including the second information indicating the one or more gap patterns, wherein the second information includes third information indicating a first gap pattern including a first gap repetition period and fourth information indicating a second gap pattern including a second gap repetition period, and wherein the transmitter is further configured to transmit, to the communication equipment, a radio resource control (RRC) reconfiguration message including a first gap configuration according to the third information and a second gap configuration according to the fourth information.

7. The base station according to claim 6, wherein:

the one or more gap patterns includes a pattern of a gap for performing an operation in a second network.

8. The base station according to claim 7, wherein:

the first gap pattern includes a first gap length and a first gap offset, and the second gap pattern includes a second gap length and a second gap offset.

9. A communication method performed by communication equipment for communicating with a plurality of networks using a plurality of subscriber identity modules, the method comprising:

receiving from a base station of a first network included in the plurality of networks, first information configuring the communication equipment to transmit a UEAssistanceInformation message including second information indicating one or more gap patterns;

transmitting to the base station, based on receiving the first information, the UEAssistanceInformation message including the second information, wherein the second information includes third information indicating a first gap pattern including a first gap repetition period and fourth information indicating a second gap pattern including a second gap repetition period; and wherein the method further comprises receiving, from the base station, a radio resource control (RRC) reconfiguration message including a first gap configuration according to the third information and a second gap configuration according to the fourth information.

10. The communication method according to claim 9, wherein:

the one or more gap patterns includes a pattern of a gap for performing an operation in a second network included in the plurality of networks.

11. The communication method according to claim 10, wherein:

the first gap pattern includes a first gap length and a first gap offset, and the second gap pattern includes a second gap length and second gap offset.

12. The communication method according to claim 10, further comprising:

performing, in the one or more gap patterns based on the first gap configuration and the second gap configuration, monitoring of a paging in the second network, performing, in the one or more gap patterns based on the first gap configuration and the second gap configuration, a measurement in the second network, not performing, in a duration other than the one or more gap patterns based on the first gap configuration and the second gap configuration, the monitoring of the paging in the second network, and not performing, in the duration other than the one or more gap patterns based on the first gap configuration and the second gap configuration, the measurement in the second network.

13. The communication method according to claim 12, wherein:

the first gap repetition period corresponds to a period for the communication equipment to monitor the paging in the second network, and the second gap repetition period corresponds to a period for the communication equipment to measure a radio condition in the second network.

* * * * *